United States Patent
Wu et al.

(10) Patent No.: US 12,440,123 B1
(45) Date of Patent: Oct. 14, 2025

(54) METHODS AND SYSTEMS FOR MUSCLE ACTIVITY MEASUREMENT AND GESTURE DETECTION

(71) Applicant: Manus Robotics, Inc., Lexington, MA (US)

(72) Inventors: Faye Y. Wu, Cambridge, MA (US); Haruhiko Harry Asada, Lincoln, MA (US); Baldin Adolfo Llorens-Bonilla, Cambridge, MA (US); Sheng Liu, Cambridge, MA (US)

(73) Assignee: Manus Robotics, Inc., Lexington, MA (US)

(*) Notice: Subject to any disclaimer, the term of this patent is extended or adjusted under 35 U.S.C. 154(b) by 733 days.

(21) Appl. No.: 16/712,971

(22) Filed: Dec. 12, 2019

Related U.S. Application Data

(60) Provisional application No. 62/778,555, filed on Dec. 12, 2018.

(51) Int. Cl.
  *A61B 5/11* (2006.01)
  *A61B 5/00* (2006.01)
  (Continued)

(52) U.S. Cl.
  CPC .......... *A61B 5/1107* (2013.01); *A61B 5/0022* (2013.01); *A61B 5/0082* (2013.01);
  (Continued)

(58) Field of Classification Search
  None
  See application file for complete search history.

(56) References Cited

U.S. PATENT DOCUMENTS

| | | | |
|---|---|---|---|
| 2007/0208231 A1* | 9/2007 | Dipl-Ing | A61B 5/1107 600/300 |
| 2014/0107493 A1* | 4/2014 | Yuen | A61B 5/7455 600/479 |

(Continued)

OTHER PUBLICATIONS

J. McNeil, "Americans with disabilities: Household economic studies," United States Census 1997, pp. 70-73.

(Continued)

*Primary Examiner* — Aurelie H Tu
(74) *Attorney, Agent, or Firm* — Spano Law Group; Joseph S. Spano

(57) ABSTRACT

Methods and systems for determining changes in muscle activity patterns based on the optical response of subcutaneous human body structures are presented, along with methods and systems for controlling assistive robotic systems based on the measured muscle activity patterns. Elements of a muscle activity measurement system are mechanically coupled to a wearable structure that fits closely to a portion of the body of a human user. The muscle activity measurement system includes multiple emitters and detectors at different spacing along the skin surface. In some embodiments, the illumination intensity of each measurement channel, the programmable gain of each measurement channel, or both, are calibrated to maximize measurement sensitivity. In some embodiments, optical measurement data is employed to more accurately locate the muscle activity measurement system with respect to the human body. In some embodiments, a muscle activity measurement system tracks changes in muscle structure over time.

7 Claims, 14 Drawing Sheets

(51) Int. Cl.
*A61F 2/70* (2006.01)
*A61H 3/00* (2006.01)
*B25J 13/08* (2006.01)
*G06F 3/01* (2006.01)
*B25J 9/00* (2006.01)

(52) U.S. Cl.
CPC .............. *A61B 5/6806* (2013.01); *A61F 2/70* (2013.01); *A61H 3/00* (2013.01); *B25J 13/08* (2013.01); *G06F 3/014* (2013.01); *A61B 2562/0233* (2013.01); *A61F 2002/704* (2013.01); *A61H 2201/1659* (2013.01); *B25J 9/0006* (2013.01)

(56) References Cited

U.S. PATENT DOCUMENTS

2017/0259428 A1* 9/2017 Assad ................ G16H 40/67
2018/0078183 A1* 3/2018 Lor ..................... G06F 3/011

OTHER PUBLICATIONS

B. Llorens-Bonilla, F. Parietti, and H. Asada, "Demonstration-based control of supernumerary robotic limbs," in Proc. of IEEE/RSJ International Conference on Intelligent Robots and Systems (IROS), Vilamoura, Portugal, 2012, pp. 3936-3942.
C. Davenport, F. Parietti, and H. Asada, "Design and Biomechanical Analysis of Supernumerary Robotic Limbs," in Proc. of ASME Dynamic Systems and Control Conference (DSCC), Fort Lauderdale, FL, 2012.
B. Llorens-Bonilla and H. Asada, "Control and Coordination of Supernumerary Robotic Limbs based on Human Motion Detection and task Petri Net," in Proc. of ASME Dynamic Systems and Control Conference (DSCC), Palo Alto, CA, 2013.
F. Parietti and H. Asada, "Dynamic Analysis and State Estimation for Wearable Robotic Limbs Subject to Human-Induced Disturbances," in Proc. of IEEE International Conference on Robotics and Automation (ICRA), Karlsruhe, Germany, May 2013.
B. Llorens-Bonilla and H. Asada, "A Robot on the Shoulder: Coordinated Human—Wearable Robot Control using Coloured Petri Nets and Partial Least Squares Predictions," in Proc. IEEE International Conference on Robotics and Automation (ICRA), Hong Kong, China, May 2014.
F. Parietti and H. Asada, "Supernumerary Robotic Limbs for Aircraft Fuselage Assembly: Body Stabilization and Guidance by Bracing," in Proc. of IEEE International Conference on Robotics and Automation (ICRA), Hong Kong, China, May 2014.
F. Parietti and H. Asada, "Bracing the Human Body with Supernumerary Robotic Limbs for Physical Assistance and Load Reduction," in Proc. of IEEE International Conference on Robotics and Automation, (ICRA), Hong Kong, China, May 2014.
F. Y. Wu and H. Asada, "Bio-Artificial Synergies for Grasp Control of Supernumerary Robotic Fingers," in Robotics: Science and Systems X (RSS), Berkeley, CA, 2014.
F. Y. Wu and H. Asada, "'Hold-and-Manipulate' with a Single Hand Being Assisted by Wearable Extra Fingers," in Proc. of 2015 IEEE International Conference on Robotics and Automation (ICRA), Seattle, WA.
F. Y. Wu and H. H. Asada, "Implicit and Intuitive Grasp Posture Control for Wearable Robotic Fingers : a Data Driven Method Using Partial Least Squares," IEEE Transactions on Robotics, vol. 32, No. 1, pp. 176-186, Feb. 2016.
F. Parietti and H. Asada, "Supernumerary Robotic Limbs for Human Body Support", IEEE Transactions on Robotics, vol. 32, No. 2, pp. 301-311, Apr. 2016.
F. Parietti and H. H. Asada, "Independent, voluntary control of extra robotic limbs," 2017 IEEE International Conference on Robotics and Automation (ICRA), Singapore, 2017, pp. 5954-5961.
F. Y. Wu and H. H. Asada, "Decoupled Motion Control of Wearable Robot for Rejecting Human Induced Disturbances", 2018 IEEE International Conference on Robotics and Automation (ICRA), Brisbane, Australia, 2018.
E. Biddiss, T. Chau, "Upper limb prosthesis use and abandonment: A survey of the last 25 years", Prosthetics and orthotics international, vol. 31, pp. 236-257, 2007.
M. Lyu, W.H. Chen, X. Ding, J. Wang, Z. Pei and B. Zhang, "Development of an EMGControlled Knee Exoskeleton to Assist Home Rehabilitation in a Game Context". Front. Neurorobot. 13:67. doi: 10.3389/fnbot.2019.00067, 2019.
T. Petrič, L. Peternel, J. Morimoto and J. Babič, "Assistive Arm-Exoskeleton Control Based on Human Muscular Manipulability". Front. Neurorobot. 13:30. doi: 10.3389/fnbot.2019.00030, 2019.
J. G. Kreifeldt, "Signal Versus Noise Characteristics of Filtered EMG used as a Control Source," IEEE Trans. Biomed. Eng., 18, pp. 16-22, 1971.
F. Carpi and R. D. De, "EMG-Based and Gaze-Tracking-Based Man-Machine Interfaces". 1st edition: Elsevier Inc; 2009.
T. Pulikottil, M. Caimmi, M. Dangelo, M. Biffi, S. Pellegrinelli, L. Molinari Tosatti, "A Voice Control System for Assistive Robotic Arms: Preliminary Usability Tests on Patients," 2018 IEEE International Conference on Biomedical Robotics and Biomechatronics, pp. 167-172, 2018.
X. Xu, J. Tang, X. Zhang, X. Liu, H. Zhang, Y. Qiu, "Exploring Techniques for Vision Based Human Activity Recognition: Methods, Systems, and Evaluation". Sensors 13, 1635-1650, 2013.
F. Jobsis, "Noninvasive, infrared monitoring of cerebral and myocardial oxygen sufficiency and circulatory parameters." Science, vol. 198 No. 4323, pp. 1264-1267, 1977.
D. Mozzafarian, E.J. Benjamin, A.S. Go, D.K. Arnett, M.J. Blaha, M. Cushman, et al., on behalf of the American Heart Association Statistics Committee and Stroke Statistics Subcommittee. "Heart disease and stroke statistics—2016 update: a report from the American Heart Association". Circulation 2016;133(4):e38-360.
Centers for Disease Control and Prevention, "Surveillance Report of Traumatic Brain Injury-related Emergency Department Visits, Hospitalizations, and Deaths—United States, 2014. Centers for Disease Control and Prevention, U.S. Department of Health and Human Services", 2019.
A. Towfighi, B. Ovbiagele, N. El Husseini, M. L. Hackett, R. E. Jorge, B. M. Kissela, P. H. Mitchell, L. E. Skolarus, M. A. Whooley, and L. S. Williams, "Poststroke Depression: A Scientific Statement for Healthcare Professionals", American Heart Association/ American Stroke Association, Stroke;48:e30-e43, 2017.
"Healthcare Assistive Robot Market Size by Product (Surveillance & Security, Humanoid, Rehabilitation, Socially Assistive), By Portability (Fixed Base, Mobile), By Application (Stroke, Orthopedics, Cognitive & Motor Skills, Sports), Industry Analysis Report, Regional Outlook, Application Potential, Competitive Market Share & Forecast (2018-2024)", 2018, Global Market Insights Inc.
P. Visconti, F. Gaetani, G. Zappatore, and P. Primiceri, Patrizio. "Technical Features and Functionalities of Myo Armband: An Overview on Related Literature and Advanced Applications of Myoelectric Armbands Mainly Focused on Arm Prostheses", International Journal on Smart Sensing and Intelligent Systems. 2018, 11(2), pp. 1-25.
M. L. Latash, "Toward a New Theory of Motor Synergies," Motor Control, 11, pp. 276-308, 2007.
A. d'Avella, P. Saltiel, and E. Bizzi, "Combinations of Muscle Synergies in the Construction of a Natural Motor Behavior," Nature Neuroscience, 6, pp. 300-308, 2003.
Y. P. Ivanenko, R. E. Poppele, and F. Lacquaniti, "Five Basic Muscle Activation Patterns Account for Muscle Activity during Human Locomotion," J. Physiol., 556, pp. 267-282, 2004.
M. B. Popovie, D. B. Popovie, and R. Tomovie, "Control of Arm Movement: Reaching Synergies for Neuroprosthesis with Life-like Control," J. Automatic Control, 12, pp. 9-15, 2002.
T. Wimboeck, B. Jan, and G. Hirzinger, "Synergy-level Impedance Control for a Multifingered Hand," Proc. of IEEE Int. Conf. Robot. Autom., pp. 973-979, 2011.
C. Brown, and H. Asada, "Inter-finger Coordination and Posture Synergies in Robot Hands via Mechanical Implementation of Principal Component Analysis," Proc. of IEEE/RSJ Int. Conference on Intelligent Robots and Systems, 2007.

(56) References Cited

OTHER PUBLICATIONS

J. Rosmarin, and H. Asada, "Synergistic Design of a Humanoid Hand with Hybrid DC Motor—SMA Array Actuators," Proc. of IEEE Int. Conference on Robotics and Automation, pp. 773-779, 2008.

N. Karnati, B. A. Kent, and E. D. Engeberg, "Bioinspired Sinusoidal Finger Joint Synergies for a Dexterous Robotic Hand to Screw and Unscrew Objects with Different Diameters," Mechatronics, IEEE/ASME Transactions on , 18(2), pp. 612-623, 2013.

M. Ciocarlie, C. Goldfeder, and P. Allen, "Dimensionality Reduction for Handindependent Dexterous Robotic Grasping," Proc. of IEEE/RSJ Int. Conf. Intell. Robot. Syst., pp. 3270-3275, 2007.

A. Miller, and P. Allen, "Graspit!: A Versatile Simulator for Robotic Grasping," IEEE Robotics and Automation Magazine, 11(4), pp. 110-122, 2004.

G. Gioio, G. Salvietti, M. Malvezi, and D. Prattichizzo, "Mapping Synergies from Human to Robotic Hands with Dissimilar Kinematics: an Approach in the Object Domain," IEEE Transactions on Robotics, 29(4), pp. 825-837, 2013.

D. D. Lee and H. S. Seung, "Learning the parts of objects by non-negative matrix factorization". Nature, 1999, 401 (6755): 788-791.

F. Wu, M. Roberts, D. Frey, and S. Foong, "Enhanced Magnetic Localization with Artificial Neural Network Field Models", in Proceedings of the 2013 IEEE International Conference on Robotics and Automation (ICRA), Karlsruhe, Germany.

I. Delis, B. Berret, T. Pozzo, and S. Panzeri, "Quantitative evaluation of muscle synergy models: A single-trial task decoding approach", Frontiers in computational neuroscience. 2013, 7(8), pp. 141-161.

C. M. Sonderer, and N. K. Chen, "Improving the Accuracy, Quality, and Signal-To-Noise Ratio of MRI Parametric Mapping Using Rician Bias Correction and Parametric-Contrast-Matched Principal Component Analysis (PCM-PCA)", The Yale journal of biology and medicine, 2018, 91(3), pp. 207-214.

D. J. Clark, L. H. Ting, F. E. Zajac, R. R. Neptune, and S. A. Kautz, "Merging of healthy motor modules predicts reduced locomotor performance and muscle coordination complexity post-stroke", J Neurophysiol. Feb. 2010; 103(2):844-57.

S. W. Lee, K. Triandafilou, B. A. Lock, and D. G. Kamper, "Impairment in task-specific modulation of muscle coordination correlates with the severity of hand impairment following stroke", PLoS One. 2013; 8(7).

W. Li, H. H. Yue, S. Valle-Cervantes, and S. J. Qin, Recursive PCA for adaptive process monitoring, Journal of Process Control, 10(5), 2000, pp. 471-486.

D.W. Lee, et al. "Modeling and Simulation of Skeletal Muscle for Computer Graphics: A Survey," Foundations and Trends in Computer Graphics and Vision, 2012, vol. 7, pp. 229-276.

Pan, Bingyu et al., "Alterations of Muscle Synergies During Voluntary Arm Reaching Movement in Subacute Stroke Survivors at Different Levels of Impairment," Frontiers in Computational Neuroscience, Aug. 21, 2018, vol. 12, Article 69, 1-11.

Carvalho, E., Bettger, J.P. and Goode, A.P., "Insurance coverage, costs, and barriers to care for outpatient musculoskeletal therapy and rehabilitation services", North Carolina medical journal, 78(5), pp. 312-314, 2017.

Goode, A.P., Freburger, J.K. and Carey, T.S., "The influence of rural versus urban residence on utilization and receipt of care for chronic low back pain", The Journal of Rural Health, 29(2), pp. 205-214, 2013.

Gatewood, C.T., Tran, A.A. and Dragoo, J.L., "The efficacy of post-operative devices following knee arthroscopic surgery: a systematic review", Knee Surgery, Sports Traumatology, Arthroscopy, 25(2), pp. 501-516, 2017.

Masiero, S., Armani, M., Ferlini, G., Rosati, G. and Rossi, A., "Randomized trial of a robotic assistive device for the upper extremity during early inpatient stroke rehabilitation", Neurorehabilitation and neural repair, 28(4), pp. 377-386, 2014.

Ren, Y., Wu, Y.N., Yang, C.Y., Xu, T., Harvey, R.L. and Zhang, L.Q., "Developing a wearable ankle rehabilitation robotic device for in-bed acute stroke rehabilitation", IEEE Transactions on Neural Systems and Rehabilitation Engineering, 25(6), pp. 589-596, 2017.

González-Ortega, D., Díaz-Pernas, F.J., Martínez-Zarzuela, M. and Antón-Rodríguez, M., "A Kinect-based system for cognitive rehabilitation exercises monitoring", Computer methods and programs in biomedicine, 113(2), pp. 620-631, 2014.

Lim, C.D., Wang, C.M., Cheng, C.Y., Chao, Y., Tseng, S.H. and Fu, L.C., "Sensory Cues Guided Rehabilitation Robotic Walker Realized by Depth Image-Based Gait Analysis", IEEE Transactions on Automation Science and Engineering, 13(1), pp. 171-180, 2017.

Hermens, H.J., Freriks, B., Disselhorst-Klug, C. and Rau, G., "Development of recommendations for SEMG sensors and sensor placement procedures", Journal of electromyography and Kinesiology, 10(5), pp. 361-374, 2000.

Disselhorst-Klug, C., Schmitz-Rode, T. and Rau, G., "Surface electromyography and muscle force: Limits in sEMG-force relationship and new approaches for applications", Clinical biomechanics, 24(3), pp. 225-235, 2009.

Staudenmann, D., Roeleveld, K., Stegeman, D.F. and Van Dieën, J.H., "Methodological aspects of SEMG recordings for force estimation—a tutorial and review", Journal of electromyography and kinesiology, 20(3), pp. 375-387, 2010.

Vinjamuri, R., Mao, Z.H., Sclabassi, R. and Sun, M., "Limitations of surface EMG signals of extrinsic muscles in predicting postures of human hand", 28th Annual International Conference of the IEEE Engineering in Medicine and Biology Society (EMBS), pp. 5491-5494, Aug. 2016.

R. Dias and J. M. d. Silva, "A Flexible Wearable Sensor Network for Bio-Signals and Human Activity Monitoring," 11th International Conference on Wearable and Implantable Body Sensor Networks Workshops, pp. 17-22, Zurich 2014.

Carvalho, H., Catarino, A.P., Rocha, A.M. and Postolache, O., "Health monitoring using textile sensors and electrodes: an overview and integration of technologies", IEEE International Symposium on Medical Measurements and Applications (MeMeA), pp. 70-75, 2014.

Di Giminiani, R., Lancia, S., Ferrari, M., Quaresima, V., Vistisen, H.T., Kliltgaard, A., Heick, R.A., Oestergard, K., Soerensen, K.Y. and Cardinale, M., "A wearable integrated textile EMG and muscle oximetry system for monitoring exercise-induced effects: a feasibility study", IEEE International Symposium on Medical Measurements and Applications (MeMeA), pp. 1-5, 2018.

Muramatsu, Y. and Kobayashi, H., "Assessment of local muscle fatigue by NIRS", Seventh International Conference on Sensing Technology (ICST), pp. 623-626, 2013.

Kimoto, A. and Yamada, Y., "A proposal of layered sensor for analysis of muscular activity", IEEE International Symposium on Medical Measurements and Applications Proceedings (MeMeA), pp. 1-4, 2012.

Kauppi, K., Korhonen, V., Ferdinando, H., Kallio, M. and Myllylä, T., "Combined surface electromyography, near-infrared spectroscopy and acceleration recordings of muscle contraction: The effect of motion", Journal of Innovative Optical Health Sciences, 10(02), p. 1650056, 2017.

M. Islam, K. Sundaraj, R. Ahmad, N. U. Ahamed, and M. Ali, "Mechanomyography sensor development, related signal processing, and applications: A systematic review", IEEE Sensors Journal, vol. 13, No. 7, pp. 2499-2516, Jul. 2013.

N. Alves and T. Chau, "Uncovering patterns of forearm muscle activity using multi-channel mechanomyography", Journal of Electromyography and Kinesiology, vol. 20, No. 5, pp. 777-786, 2010.

C. Castellini, G. Passig, and E. Zarka, "Using ultrasound images of the forearm to predict finger positions," IEEE Transactions on Neural System Rehabilitation, Eng., vol. 20, No. 6, pp. 788-797, Nov. 2012.

N. Akhlaghi et al., "Real-time classification of hand motions using ultrasound imaging of forearm muscles," IEEE Transactions on Biomedical Engineering, vol. 63, No. 8, pp. 1687-1698, Aug. 2016.

Cope, M. and Delpy, D.T., "System for long-term measurement of cerebral blood and tissue oxygenation on newborn infants by near infrared transillumination", Medical and Biological Engineering and Computing, 26(3), pp. 289-294, 1988.

(56) References Cited

OTHER PUBLICATIONS

Courteville, A., Gharbi, T. and Cornu, J., "Noncontact MMG sensor based on the optical feedback effect in a laser diode", Journal of biomedical optics, 3(3), pp. 281-286, 1998.

Muhammed, H.H. and Jammalamadaka, R., "A new approach for rehabilitation and upper-limb prosthesis control using optomyography (OMG)", IEEE International Conference on Biomedical Engineering (IBIOMED), pp. 1-6, 2016.

Leal Junior, E.C.P., Lopes-Martins, R.Á.B., Rossi, R.P., De Marchi, T., Baroni, B.M., De Godoi, V., Marcos, R.L., Ramos, L. and Bjordal, J.M., "Effect of cluster multi-diode light emitting diode therapy (LEDT) on exercise-induced skeletal muscle fatigue and skeletal muscle recovery in humans", Lasers in Surgery and Medicine: The Official Journal of the American Society for Laser Medicine and Surgery, 41(8), pp. 572-577, 2009.

Ferrari, M., Muthalib, M. and Quaresima, V., "The use of near-infrared spectroscopy in understanding skeletal muscle physiology: recent developments". Philosophical Transactions of the Royal Society A, 369(1955), pp. 4577-4590, 2011.

Korthuis, R.J., "Skeletal muscle circulation". In Colloquium Series on Integrated Systems Physiology: From Molecule to Function, vol. 3, No. 4, pp. 1-144, Morgan & Claypool Life Sciences, Jun. 2011.

Ash C, Dubec M, Donne K, Bashford T. Effect of wavelength and beam width on penetration in light-tissue interaction using computational methods. Lasers Med Sci. Vol. 32, No. 8, pp. 1909-1918, 2017.

Samuel, I., Bansal, A.K., Hou, S. and Kulyk, O., "An organic optoelectronic muscle contraction sensor for prosthetics", SPIE Newsroom, Mar. 2015.

Lin, Y., Lech, G., Nioka, S., Intes, X. and Chance, B., "Noninvasive, low-noise, fast imaging of blood volume and deoxygenation changes in muscles using light-emitting diode continuous-wave imager", Review of Scientific Instruments, 73(8), pp. 3065-3074, 2002.

Boushel, R. and Piantadosi, C.A., "Near-infrared spectroscopy for monitoring muscle oxygenation", Acta Physiologica Scandinavica, 168(4), pp. 615-622, 2000.

A. N. Bashkatov, E. A. Genina, V. I. Kochubey, and V. V Tuchin, "Optical properties of human skin, subcutaneous and mucous tissues in the wavelength range from 400 to 2000 nm", Journal of Physics D. Applied Physics, vol. 38, No. 15, pp. 2543-2555, 2005.

Saleem A, Canal C, Davis LAJ, Green RJ, Hutchins DA, "Near Infrared Transmission through Various Clothing Fabrics", Journal of Textile Science and Engineering, 3:129. doi: 10.4172/2165-8064. 1000129, 2013.

\* cited by examiner

METHODS AND SYSTEMS FOR MUSCLE ACTIVITY MEASUREMENT AND GESTURE DETECTION

CROSS REFERENCE TO RELATED APPLICATIONS

The present application for patent claims priority under 35 U.S.C. § 119 from U.S. provisional patent application Ser. No. 62/778,555, entitled "Muscle Activity Measurement Unit," filed Dec. 12, 2018, the subject matter of which is incorporated herein by reference in its entirety.

TECHNICAL FIELD

The described embodiments relate to systems and methods for measurement of muscle activity and detection of gestures based on the measured muscle activity.

BACKGROUND INFORMATION

A significant number of people are affected by musculoskeletal (MSK) injuries or diseases. Unfortunately, relatively few actually complete rehabilitation sessions designed to treat these ailments. Treatment programs and their associated costs are highly variable, and generally, the effectivity of many MSK rehabilitation programs is not well understood. In many cases, there is insufficient quantitative evidence to correlate specific treatment duration with recovery. The lack of data supporting many rehabilitation programs is caused, in part, by lack of patient compliance. As a result, people struggle with lingering pain and disability. This leads to increased overall health costs as health conditions deteriorate and become more complex as time passes.

Systems have been developed to aid post-surgery, at-home exercise. These systems typically utilize motion sensors that are strapped to the body or cameras that point at the patient to check the range of motion of specific limbs as the patient performs a suite of movements under remote supervision of physical therapists. These motion-based systems are very expensive and only collect general movement data. Furthermore, such systems are only useful to patients who are able to generate the specified movements.

Several techniques exist to sense specific muscle activation. However, various issues render these techniques impractical for long-term rehabilitation tracking. The most widely employed technology in neurophysiology and electro-diagnostic medicine is surface electromyography (EMG). EMG noninvasively measures neural signals sent to activate superficial skeletal muscles. However, continuous monitoring of muscle activation for a sustained period with EMG is challenging. EMG measurement electrodes are typically single-use and glued directly to the skin. They are inconvenient to apply, uncomfortable to wear for an extended period of time, and susceptible to artifacts caused by movement, sweat, body hair, subcutaneous tissue, as well as surrounding electromagnetic noise. More recently, textile electrodes embedded in tight-fitting garments have been developed to overcome some of the problems associated with surface electrodes, but the reliability of the signals obtained from these garments has yet to match that from conventional electrodes.

In some other examples, near-infrared spectroscopy (NIRS) is employed to detect muscle activity. NIRS measurements capture changes in oxygen consumption and hemodynamics in human tissue. Since oxygen delivery and consumption in capillary beds indirectly reflects muscle activity, NIRS measurement data is indicative of muscle activity. Typical NIRS-based muscle measurements are based on probes in contact with skin. The probes are often secured with uncomfortable and awkward to use tapes or bandages. In addition, NIRS measurements are affected by motion artifacts and signal attenuation caused by subcutaneous adipose tissue. Commercially available systems, especially sophisticated systems that employ laser diode illuminators, are quite large and cumbersome to carry. As a result, current NIRS-based muscle activity measurement systems are not compatible with long-term, everyday use cases.

Researchers have explored other methods to evaluate muscle activity. These methods include: 1) mechanomyography, which measures the transverse displacement of the skin over a contracting muscle, 2) musculoskeletal sonography, which uses ultrasound waves to scan for muscle movement, and 3) magnetic resonance spectroscopy which employs magnetic resonance imagery to study the metabolic changes in muscle. However, due to lack of spatial resolution, cost, equipment size, power consumption, and potential harm to the body after prolonged exposure, these options are also not compatible with long-term, everyday use cases.

Regardless of cost, in many cases, rehabilitation training remains the sole therapeutic approach to recover lost motor skills. The majority of stroke patients who initiate rehabilitation therapy soon after a stroke can regain a significant amount of motor function. For patients who start their training in a later stage of disability, or never start at all, the recovery of lost function is often limited, resulting in chronic hemiplegia or hemiparesis. Patients who are left hemiplegic or hemiparetic are often placed at skilled nursing facilities, rather than returning home.

Many devices have been studied for rehabilitation and assistance of those suffering from disability. In some examples, prosthetic devices substitute lost biological limbs with mechanical proxies. Prosthetic devices improve the quality of life of amputees. In other examples, exoskeleton devices extend strength and endurance by attaching actuators to individual human joints. Orthotic exoskeletons may help restore lost limb functions, although most are developed for patients with lower extremity disabilities. More often, upper limb exoskeleton devices are employed for robot-assisted rehabilitation treatment. These therapies have been shown to increase motor recovery in patients suffering from subacute and chronic stroke subacute cervical spinal cord injury, and multiple sclerosis.

In another example, supernumerary robotic (SR) limbs are attached to the body to assist a patient to hold objects, support body weight, and streamline task execution. SR fingers have some advantages. For example, no torque is applied to a disabled human finger, and the SR fingers can safely generate a large force. Unlike exoskeleton devices, SR Fingers are not constrained to affected, disabled fingers. SR fingers can assume an arbitrary posture that is independent of the affected fingers. This allows an SR finger to assist in the performance of daily tasks that are difficult to perform with a finger exoskeleton. For example, a SR finger can touch a hot object that would otherwise burn affected, insensitive fingers. In contrast, a finger exoskeleton device would force the insensitive, affected fingers to grasp the hot object directly.

In general, assistive robots, including prostheses, exoskeletons, and supernumerary robotic limbs, can help those with limb impairments regain strength and range of motion, and ultimately, lead more independent lives. However, correctly determining user intent for control of robot motion is a critical limitation to widespread adoption of assistive robots.

Several commercially available assistive robots use electromyography (EMG) signals generated during muscle contraction to infer user intent. However, as described hereinbefore, EMG signals are typically generated by single-use electrode patches glued directly to the skin of the user. EMG patches tend to be inconvenient to apply and uncomfortable to use for a sustained period. Moreover, EMG electrodes are susceptible to motion artifacts as well as surrounding electromagnetic noise. Devices employing EMG sensor systems require considerable end-user training as well as filtering to obtain sufficiently consistent signals for detection of user intent.

While many assistive robots are available to help patients regain some functionality in their affected limbs, the adoption rate of these devices remains relatively low due to their high cost and complex operation. In most cases, assistive robots are controlled by EMG signals captured from small sections on impaired limb where the robot and the user are in direct contact. This method is not only prone to noise and motion artifacts, but also limit robot control options as the small contact sites do not provide a large number of distinct signals.

In summary, improvements in systems to unobtrusively monitor muscle activity of the human body for long periods of time are desired to enable rehabilitation monitoring and to provide measurement data suitable for control of assistive robotic devices.

SUMMARY

Methods and systems for determining changes in muscle activity patterns based on the optical response of subcutaneous human body structures are presented herein. The monitoring of changes of muscle activity patterns over long periods of time helps patients adhere to rehabilitation exercise programs and helps doctors improve the design of treatment programs. In addition, methods and systems for controlling assistive robotic systems based on the measured muscle activity patterns as described herein are also presented.

In one aspect, a muscle activity measurement system includes multiple illumination sources having different emission wavelengths.

In another aspect, muscle activity patterns are measured based on optical response signals collected by the muscle activity measurement system while a human user engages in voluntary muscle activity.

In another aspect, the elements of a muscle activity measurement system are mechanically coupled to a wearable structure that fits closely to a portion of the body of a human user.

In a further aspect, a muscle activity measurement system includes multiple emitter/detector combinations at different spacing along the skin surface.

In another further aspect, measurements are performed at different illumination intensity levels, different illumination pulse frequencies, or both, to probe different tissue depths and further increase measurement diversity.

In another further aspect, a muscle activity measurement system includes signal conditioning electronics to modulate and amplify the optical signals to increase the signal to noise ratio of detected signal and improve detection sensitivity.

In some embodiments, a muscle activity measurement system performs measurements associated with different measurement channels, sequentially. In some embodiments, a muscle activity measurement system performs measurements associated with different measurement channels, simultaneously.

In another further aspect, a muscle activity measurement system encodes each measurement channel or combination of measurement channels with a different prescribed code. The known code is used to decode the measured signals to separate the measured signal into different components, each associated with a different measurement channel or combination of channels.

In another further aspect, a muscle activity measurement system varies the light emission associated with each measurement channel or combination of measurement channels at a different prescribed frequency. The known frequencies are used to separate the measured signal into different components, each associated with a different measurement channel or combination of channels.

In another aspect, a muscle pattern activity model is trained to determine muscle activity patterns from the optical measurement data collected from the optical illumination and sensing module.

In another further aspect, a muscle activity measurement system calibrates the illumination intensity of each measurement channel, the programmable gain of each measurement channel, or both, to maximize measurement sensitivity.

In another further aspect, muscle activity measurement system includes a motion sensing module, such as an inertial measurement device, to measure the movement of the muscle activity measurement system with respect to the environment, i.e., inertial space occupied by the human user.

In another further aspect, a muscle activity measurement system employs data from the motion sensing module and the optical illumination and sensing module to guide the human user to more accurately locate the muscle activity measurement system with respect to the human body.

In another further aspect, a muscle activity measurement system employs data from the motion sensing module to further calibrate the alignment of the muscle activity measurement system with respect to the body of the human user.

In another further aspect, gestures executed by a human user are detected based on measured muscle activity patterns based on a trained gesture detection model.

In another further aspect, an assistive robotic device is controlled based on gestures detected as described herein. In this manner, a wearable muscle activity monitoring system facilitates the operation of other assistive robots, such as exoskeletons, prostheses, and modular robotic arms mounted on tables, wheelchairs, or the human user.

In another further aspect, rigid body motion of a muscle activity measurement system is measured and employed to estimate muscle activity patterns on a faster time scale than optical based measurements.

In another further aspect, a muscle activity measurement system is employed to map muscle structure periodically over time for a prescribed set of human movements. Measured changes in the muscle structure are indicative of the progress of a rehabilitation treatment program.

The foregoing is a summary and thus contains, by necessity, simplifications, generalizations, and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Reference will now be made in detail to background examples and some embodiments of the invention, examples of which are illustrated in the accompanying drawings.

Methods and systems for determining changes in muscle activity patterns based on the optical response of subcutaneous human body structures at different wavelengths are presented herein. The monitoring of changes of muscle activity patterns over long periods of time helps patients adhere to rehabilitation exercise programs and helps doctors improve the design of treatment programs. In addition, methods and systems for controlling assistive robotic systems based on the measured muscle activity patterns as described herein are also presented.

Monitoring of changes in muscle activity patterns enables more comprehensive analysis of patient capability and promotes exercise during everyday living outside of the scheduled rehabilitation sessions. These benefits are especially impactful to patients who are able to contract muscles but have difficulty performing coordinated motion activities. By targeting and reporting specific muscle activities, improvements are more clearly quantified and made visible to the patient, which in turn encourages the completion of a rehabilitation program.

In addition to improving rehabilitation treatment, the methods and systems for measuring changes in muscle activity patterns described herein can be applied to sports training, neurological disorder monitoring, drug effects studies, ergonomics research, and enable people with disabilities to control assistive robotic devices that help to perform daily living tasks and facilitate communication via digital devices.

Figure 1:
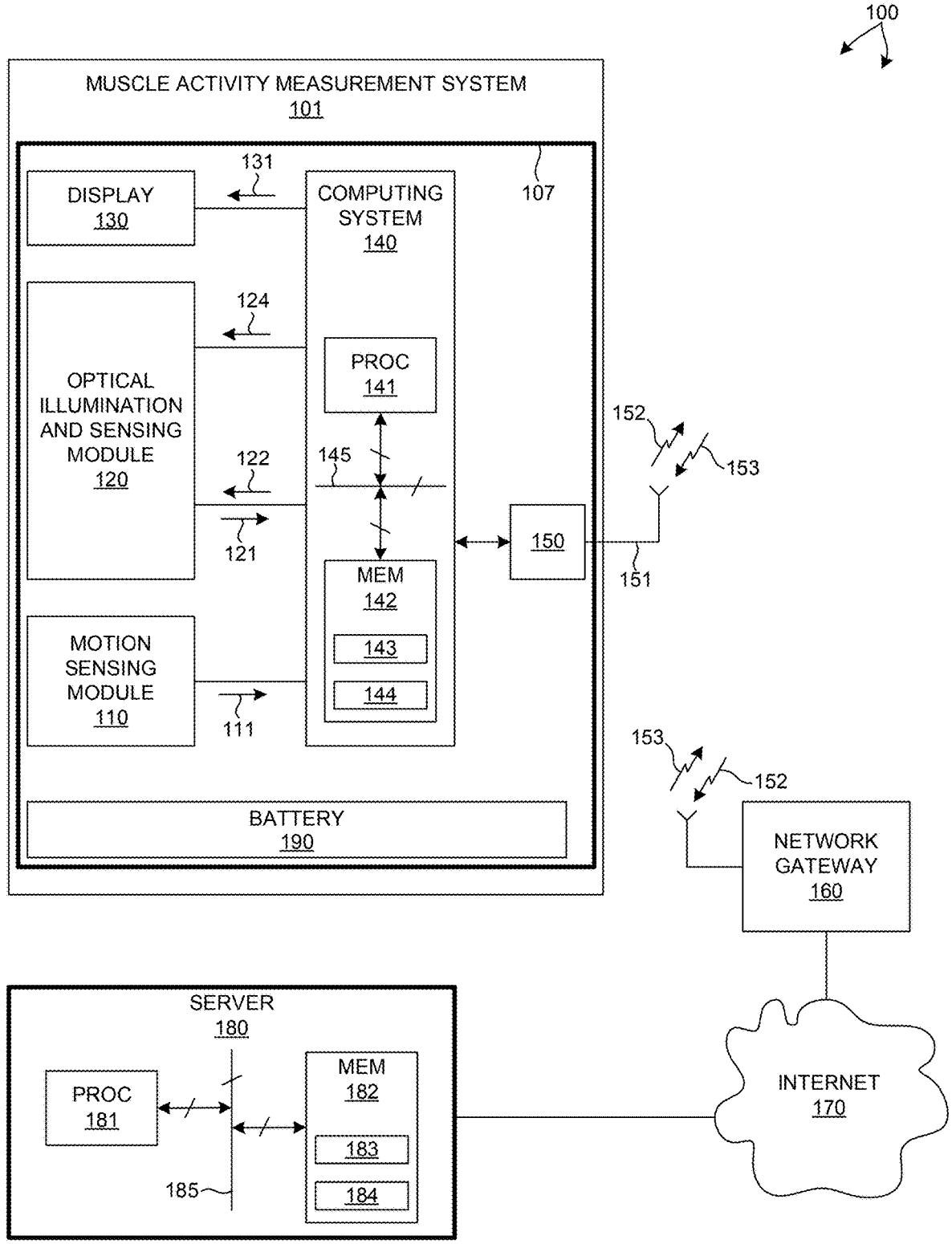
FIG. 1 depicts a muscle activity tracking system including a muscle activity measurement system in one embodiment.

FIG. 1 depicts a muscle activity tracking system 100 including a muscle activity measurement system 101 in one embodiment. Although, the embodiment of muscle activity measurement system 101 depicted in FIG. 1 includes display 130 and motion sensing module 110, in general, these elements are optional, and may not be present in other suitable embodiments. As depicted in FIG. 1, muscle activity measurement system 101 includes an optical illumination and sensing module 120 including multiple illumination sources and multiple photodetectors. The illumination sources and photodetectors measure the optical response of subcutaneous structures including muscular structures and blood vessels.

Muscle activity measurement system 101 also includes a computing system 140 to control the measurement process and process signals generated by the photodetectors. As depicted in FIG. 1, command signals 124 are communicated to optical illumination and sensing module 120 that cause the optical illumination and sensing module 120 to control the intensity of light emitted from each illumination source of the optical illumination and sensing module 120 to a desired level. Command signals 122 are communicated to optical illumination and sensing module 120 that cause the optical illumination and sensing module 120 to control the sensitivity of each photodetector of the optical illumination and sensing module 120 to a desired level. Each combination of illumination source and photodetector of the optical illumination and sensing module 120 comprises a measurement channel of the muscle activity measurement system 101. An indication of the detected intensities 121 associated with each measurement channel is communicated from the optical illumination and sensing module 120 to computing system 140.

In addition, processed measurement results 152 are communicated wirelessly from muscle activity measurement system 101 and control commands 153 are communicated onto muscle activity measurement system 101 via wireless transceiver 150. A battery 190 provides electrical power to the elements of muscle activity measurement system 101.

In one aspect, a muscle activity measurement system includes multiple illumination sources having different emission wavelengths. The determination of muscle activity patterns is based on the optical response of subcutaneous structures to different illumination wavelengths. In some embodiments, the illumination sources of muscle activity measurement system 101 are light emitting diodes (LEDs). At least two LEDs have different emission wavelengths. In some embodiments, different LED illumination sources emit different wavelengths in the visible, near infrared, infrared wavelength ranges, or any combination thereof. The photodetectors of muscle activity measurement system 101 receive the light scattered or reflected back from muscle and vascular structures, and generate output signals indicative of the intensity of the detected light.

Muscle structures include many fibers surrounded by blood vessels. When near-infrared light (e.g., light in a range from 700 nanometers to 900 nanometers) is incident on a muscle group, light absorbing particles in the bloodstream, such as oxygenated hemoglobin, deoxygenated hemoglobin, and water, absorb some amount of light. The light reflected back from muscle tissue and detected by a photodetector indicates changes in blood flow, tissue oxygenation, and muscle contraction. As muscles contract, the differential absorption as well as scattering spectra from various tissue layers changes due to increased muscle fiber density, elevated vessel compression, and surge in local metabolic activities. A muscle activity measurement system measures the light-tissue interactions at different wavelengths that penetrate tissue at varying depths and extracts muscle activity as well as other relevant biological and functional information about the user from the optical signals.

In some embodiments, one or more illumination sources of muscle activity measurement system 101 are broadband emitting light sources such as a phosphor converted LED. In these embodiments, a grating or prism is placed in the optical path before the photodetector to spatially separate different wavelengths at the detector surface.

In another aspect, the elements of a muscle activity measurement system are mechanically coupled to a wearable structure that fits closely to a portion of the body of a human user. In the embodiment depicted in FIG. 1, the elements of muscle activity measurement system 101 are mechanically coupled to wearable structure 107. Muscle activity measurement system 101 is a lightweight wearable measurement system that can be attached to many areas of human body to measure muscle activity patterns.

Figure 2:
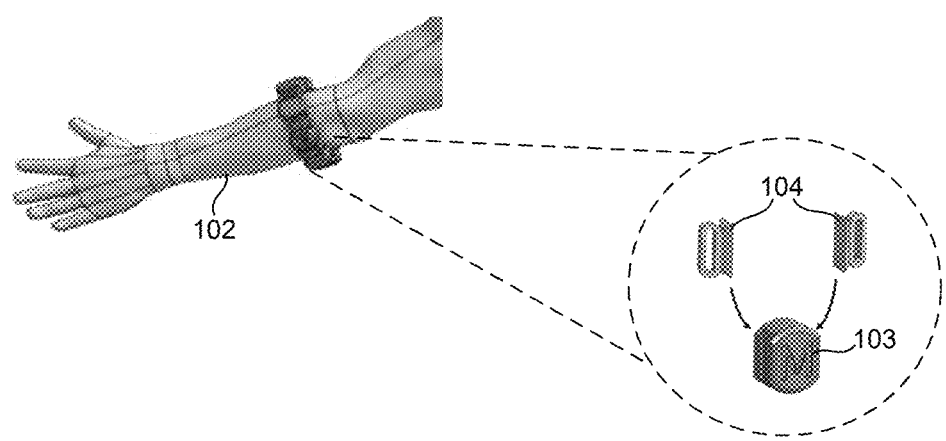
FIG. 2 depicts an embodiment of a muscle activity measurement system attached to a human user at the forearm.
Figure 3:
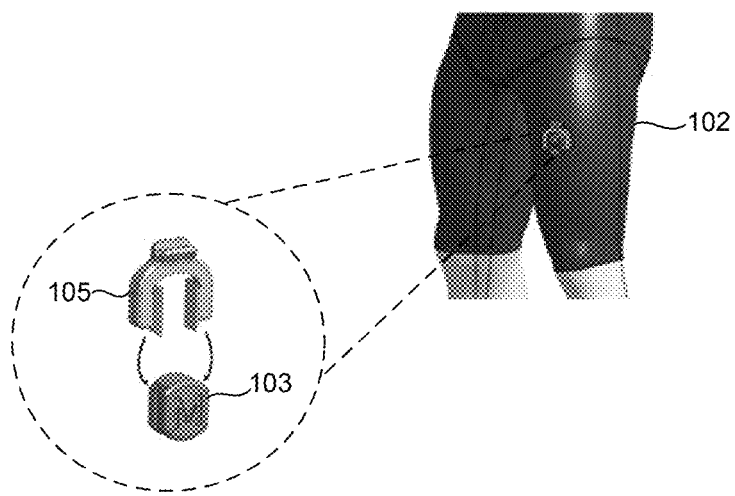
FIG. 3 depicts an embodiment of a muscle activity measurement system attached to a human user at the upper leg.
Figure 4:
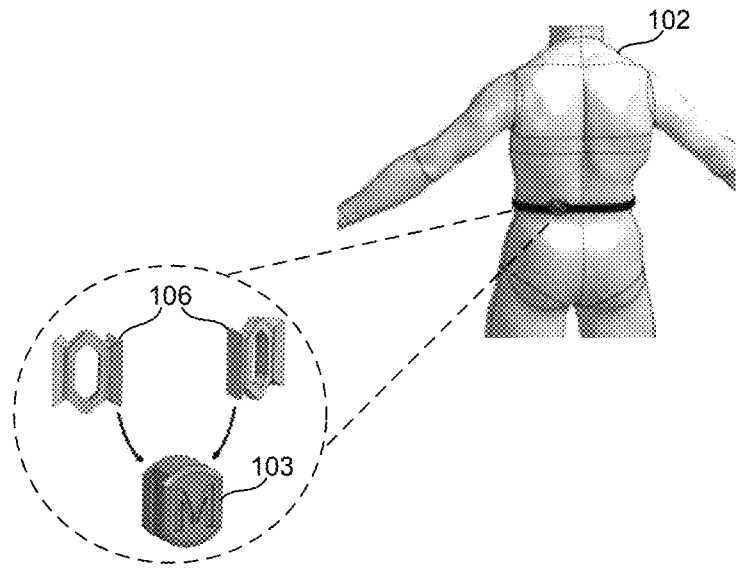
FIG. 4 depicts an embodiment of a muscle activity measurement system attached to a human user at the waist.

FIGS. 2-4 depict an embodiment 103 of a muscle activity measurement system attached to a human user 102 in different locations.

FIG. 2 depicts an embodiment of a muscle activity measurement system attached to a human user 102 at the forearm. In this embodiment, loop structures 104 are removeably attached to either side of a number of housings 103. Each housing 103 includes an optical illumination and sensing module 120 as described with respect to FIG. 1. In addition, one of the housings 103 also includes computing system 140, motion sensing module 110, battery 190, and radio transceiver 150 as described with reference to FIG. 1. In this manner, one housing 103 includes a battery to power the electronic elements within all housings 103 as well the computing system and wireless transceiver required to process and communicate the measured muscle activity data collected from all of the measurement modules. An elastic band is fitted through each of the loop structures 104 to hold the housings 103 around the circumference of the wrist of the human user 102. In addition, electrical conductors are fit between each adjacent housing 103 to electrically couple the electronic elements within housings 103 to one another. In this manner, multiple optical illumination and sensing modules are connected together around the circumference of the forearm to form a sensor band to monitor multiple muscle groups at the same time.

FIG. 3 depicts an embodiment of a muscle activity measurement system attached to a human user 102 at the upper leg. In this embodiment, a clip structure 105 is employed to removeably attach housing 103 to the clothing covering the upper leg of the human user 102. In this embodiment, housing 103 includes an optical illumination and sensing module 120, computing system 140, motion sensing module 110, battery 190, and radio transceiver 150 as described with reference to FIG. 1.

FIG. 4 depicts an embodiment of a muscle activity measurement system attached to a human user 102 at the waist. In this embodiment, loop structures 106 are removeably attached to either side of a housing 103. An elastic band is fitted through each of the loop structures 106 to hold housing 103 around the circumference of the waist of the human user 102. In this embodiment, housing 103 includes an optical illumination and sensing module 120, computing system 140, motion sensing module 110, battery 190, and radio transceiver 150 as described with reference to FIG. 1.

Figure 5:
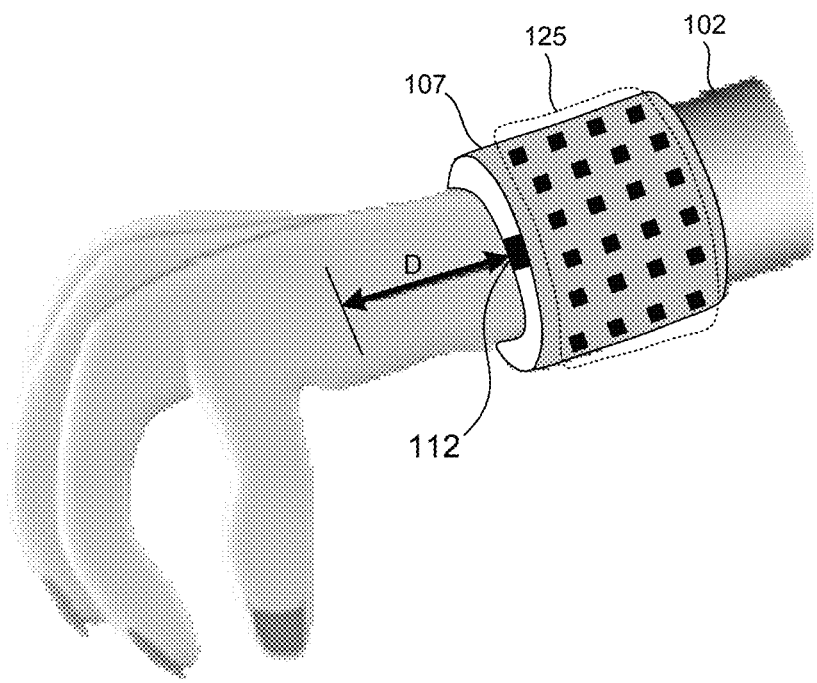
FIG. 5 depicts an embodiment of a muscle activity measurement system attached to a human user 102 with an elastic, wearable structure 107.

FIG. 5 depicts an embodiment of a muscle activity measurement system attached to a human user 102 with an elastic, wearable structure 107. As depicted in FIG. 4, an array of illumination sources and photodetectors 125 is fitted to wearable structure 107 and located in close proximity to the skin of human user 102. In addition, wearable structure 107 also includes computing system 140, motion sensing module 110, battery 190, and radio transceiver 150 as described with reference to FIG. 1. In some embodiments, each illumination source and photodetector is located in direct contact with the skin of human user 102. In some embodiments, a thin cloth or film is located between each illumination source and photodetector and the skin of human user 102. Wearable structure 107 is elastic and securely fits the human body.

In the embodiment depicted in FIG. 5, the muscle activity measurement system is located around the forearm of human user 102. However, in general, a wearable structure 107 including a muscle activity measurement system may be located around any suitable portion of the body of human user 102.

In addition, at least one emitter and a corresponding photodetector 112 are located along the edge of wearable structure 107 such that the emitter and photodetector probe distance in a direction aligned with the length of the forearm of human user 102. The emitter/photodetector combination 112 measures the distance between the wearable structure 107 and another structure of the human body such as the hand or upper arm to calibrate the location of wearable structure 107 with respect to the body of human user 102.

Figure 6A:
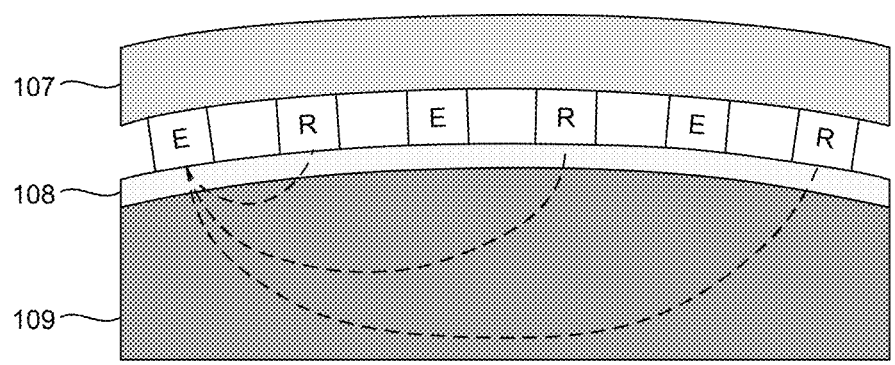
FIGS. 6A-6B depict cross sectional views of an elastic, wearable structure including several emitters and photodetectors in contact with the cutaneous layer of the human user.
Figure 6B:
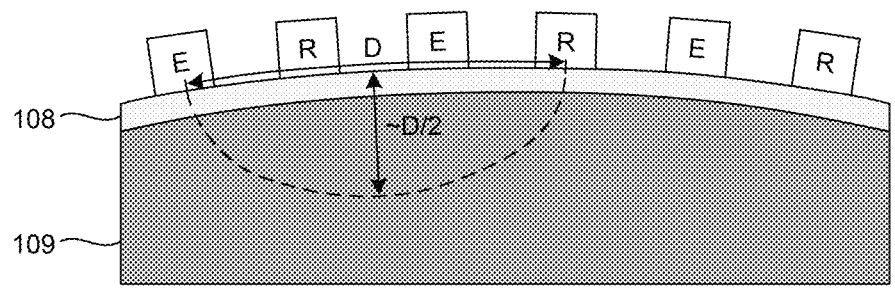

FIG. 6A depicts a cross sectional view of elastic, wearable structure 107 including several emitters (denoted by the letter, "E") and photodetectors (denoted by the letter, "R") in contact with the cutaneous layer 108 of the human user 102. As described hereinbefore, each combination of emitter and detector comprises a different measurement channel. Furthermore, the depth of penetration of the optical measurement into the subcutaneous layer 109 depends on the spacing between each emitter/detector combination (i.e., each measurement channel). As depicted in FIG. 6B, near-infrared illumination light penetrates subcutaneous tissue to a depth which is approximately half the distance between the emitter/detector combination on the skin surface. In one example, an emitter/detector combination is located 30 millimeters apart at the skin surface. This measurement channel typically probes subcutaneous tissue at a depth of approximately 15 millimeters.

In a further aspect, a muscle activity measurement system includes multiple emitter/detector combinations at different spacing along the skin surface. As a result, each of these emitter/detector combinations probes a different depth into the subcutaneous tissue. For example, as depicted in FIG. 6A, three different emitter/receiver combinations are illustrated, each having a different spacing and corresponding penetration depth.

As depicted in FIG. 6A, an array of emitters and detectors arranged with a constant lattice spacing results in a number of different measurement channels capable of measuring the optical response of subcutaneous tissue at different depths. Furthermore, the use of emitters having different wavelength emission also results in different penetration depths. Thus, the combination of different measurement channel spacing and different wavelength emission creates a diverse set of penetration depths of the muscle activity measurement system.

Figure 7:
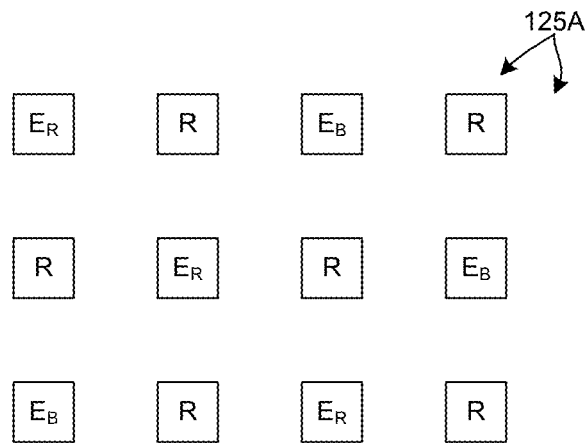
FIG. 7 depicts a grid layout of emitters and detectors including different colored emitters in different grid locations.
Figure 8:
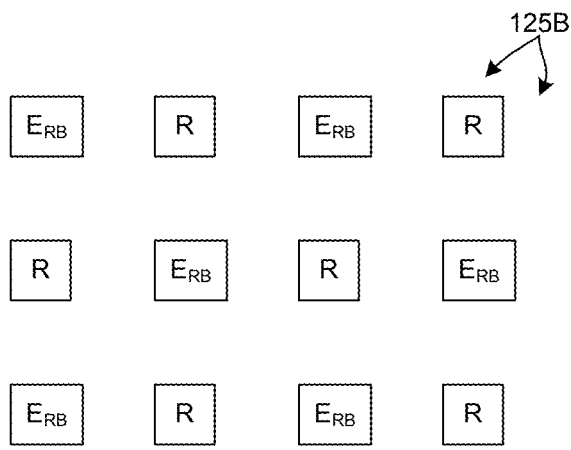
FIG. 8 depicts a grid layout of emitters and detectors including different colored emitters in the same grid locations.
Figure 9:
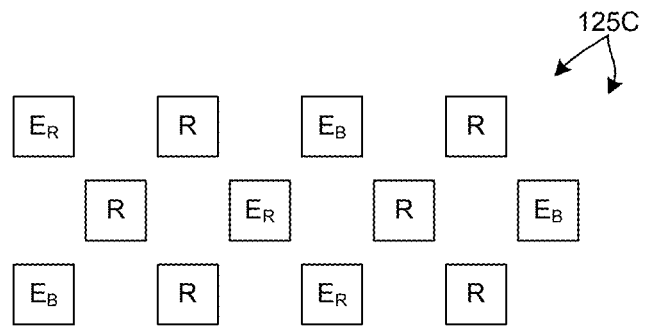
FIG. 9 depicts a hexagonal grid layout of emitters and detectors including different colored emitters in different grid locations.

FIGS. 7-9 depict different layouts of emitters and detectors by way of non-limiting example. FIG. 7 depicts a grid layout 125A of emitters and detectors including different colored emitters in different grid locations. As depicted in FIG. 7, "ER" denotes an LED having a red colored emission and "Ep" denotes an LED having a blue colored emission. Although, two different colored emitters are described with reference to FIG. 7, in general, any number of different colored LEDs in different locations may be contemplated within the scope of this patent document.

FIG. 8 depicts a grid layout 125B of emitters and detectors including different colored emitters in the same grid locations. As depicted in FIG. 8, "ERB" denotes a two channel LED having a separately addressable red colored emission and blue colored emission. In one example, the two channel LED is an integrated LED package including two different colored emitter surfaces adjacent to one another and facilities to independently control the emission from each different emitter. Although, two different colored emitters are described with reference to FIG. 8, in general, any number of different colored LEDs in the same locations may be contemplated within the scope of this patent document.

FIG. 9 depicts a grid layout 125C of emitters and detectors including different colored emitters in different grid locations. As depicted in FIG. 9, the grid pattern is hexagonal, in contrast to the square grid patterns illustrated in FIGS. 7 and 8. Although, FIGS. 7-9 depict either square of hexagonal grid patterns, in general, in general, any suitable grid pattern may be contemplated within the scope of this patent document.

Furthermore, in general, the layout of emitters and detectors may not follow a specific grid pattern at all. The quantity, location, and distribution of the optical components can be tuned to enhance the detection of specific muscle groups associated with particular muscular activities to be monitored. In some examples, computational models of the muscle structures to be measured (e.g., forearm muscle groups) are employed to analyze different layouts of optical elements. Each design is evaluated with respect to raw data sensitivity, orthogonality, collinearity, and prediction error covariance to determine an optimal array of emitters and detectors.

As described hereinbefore, different illumination wavelengths and emitter/detector spacings may be employed to probe different tissue depths, thus increasing measurement diversity. In another further aspect, measurements are performed at different illumination intensity levels, different illumination pulse frequencies, or both, to probe different tissue depths and further increase measurement diversity.

In a further aspect, a muscle activity measurement system includes signal conditioning electronics to modulate and amplify the optical signals to increase the signal to noise ratio of detected signal and improve detection sensitivity.

In one embodiment, optical illumination and sensing module includes a circuit for lock-in modulation and amplification of the optical signals associated with each measurement channel. In some embodiments, a multiplexer is employed to sequentially process signals associated with each measurement channel. In some embodiments, a multiple channel circuit is employed to process signals associated with multiple measurement channels simultaneously. In some embodiments, a combination of one or more multiple channel circuits and one or more multiplexers is employed.

To minimize noise, the illumination provided at each measurement channel is varied in a prescribed manner and received signals filtered in accordance with the prescribed illumination to filter out noise. In some embodiments, illumination is varied sinusoidally at a prescribed frequency. A narrow band pass filter centered at the prescribed frequency is employed to filter the received signals to reject noise that includes frequency components other than those passed by the narrow band filter.

Measurements performed by each measurement channel are performed sequentially, simultaneously, or a combination thereof.

In a further aspect, a muscle activity measurement system performs measurements associated with each measurement channel, or combination of measurement channels, sequentially. Measurements performed sequentially are separated from one another by time. Thus, sequential measurements are not subject to cross-talk among measured channels. Sequential measurements may be advantageous from the perspective of signal quality, but sequential measurements take more time, resulting in further delay in the availability of muscle activity data.

Measurement throughput is dramatically improved by performing measurements simultaneously, but measurements performed simultaneously are not separated from one another by time. Thus, simultaneous measurements may be contaminated by cross-talk among measured channels, particularly if multiple emitters are illuminated at the same time.

In a further aspect, a muscle activity measurement system encodes each measurement channel or combination of measurement channels with a different prescribed code. The known code is used to decode the measured signals to separate the measured signal into different components, each associated with a different measurement channel or combination of channels. In some embodiments, measurements using different wavelengths are made simultaneously. The illumination provided by each different colored emitter is encoded with a different prescribed code. Knowledge of this code is used to decode the measurement results to separate the measured signal into different components, each associated with a different color.

In another further aspect, a muscle activity measurement system varies the light emission associated with each measurement channel or combination of measurement channels at a different prescribed frequency. The known frequencies are used to filter the measured signals to separate the measured signal into different frequency components, each associated with a different measurement channel or combination of channels. For example, measurements using different wavelengths can be made simultaneously. The illumination provided by each different colored emitter is varied at a different frequency (much lower than a carrier frequency used to filter noise). Knowledge of these frequencies is used to decode the measurement results to separate the measured signal into different components, each associated with a different color based on frequency.

Figure 10:
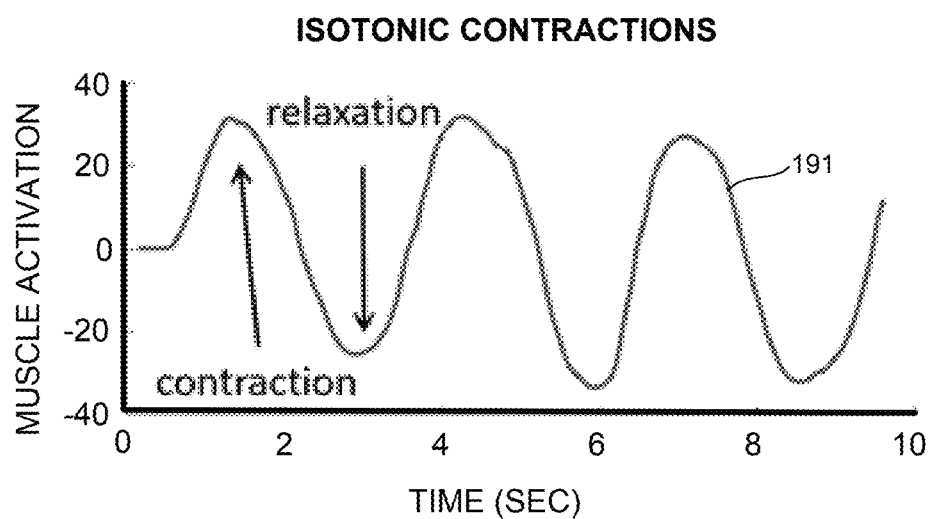
FIG. 10 depicts a plot of intensity measured by a photodetector of a muscle activity measurement system during a sequence of isotonic muscle contractions.

FIG. 10 depicts a plotline 191 of intensity measured by a photodetector of a muscle activity measurement system. The measured intensity is indicative of muscle activation over time for a series of isotonic muscle contractions. As depicted in FIG. 10, the muscle activity measurement system is sensitive to isotonic muscle contractions.

Figure 11:
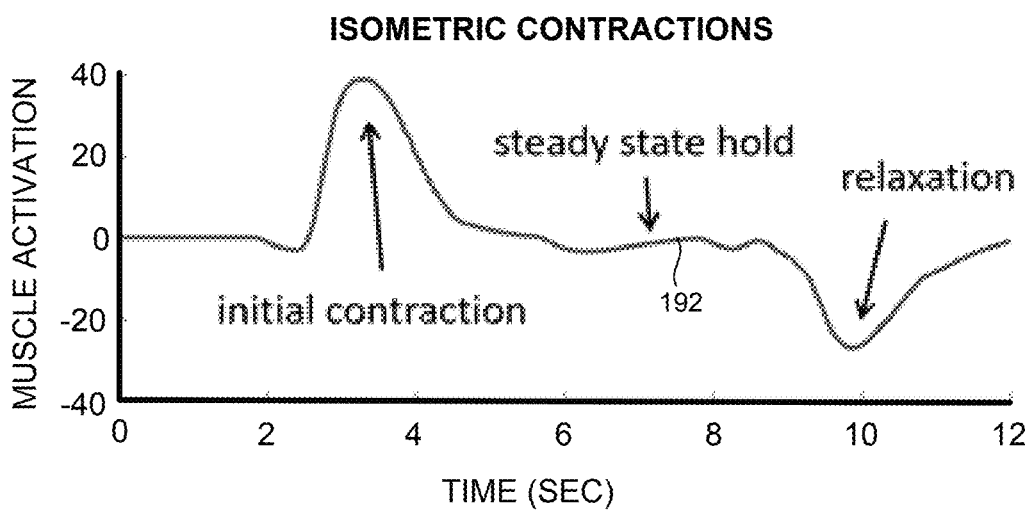
FIG. 11 depicts a plot of intensity measured by a photodetector of a muscle activity measurement system during a sequence of isometric muscle contractions.

FIG. 11 depicts a plotline 192 of intensity measured by a photodetector of a muscle activity measurement system. The measured intensity is indicative of muscle activation over time for a series of isometric muscle contractions. As depicted in FIG. 11, the muscle activity measurement system is also sensitive to isometric muscle contractions.

Figure 12:
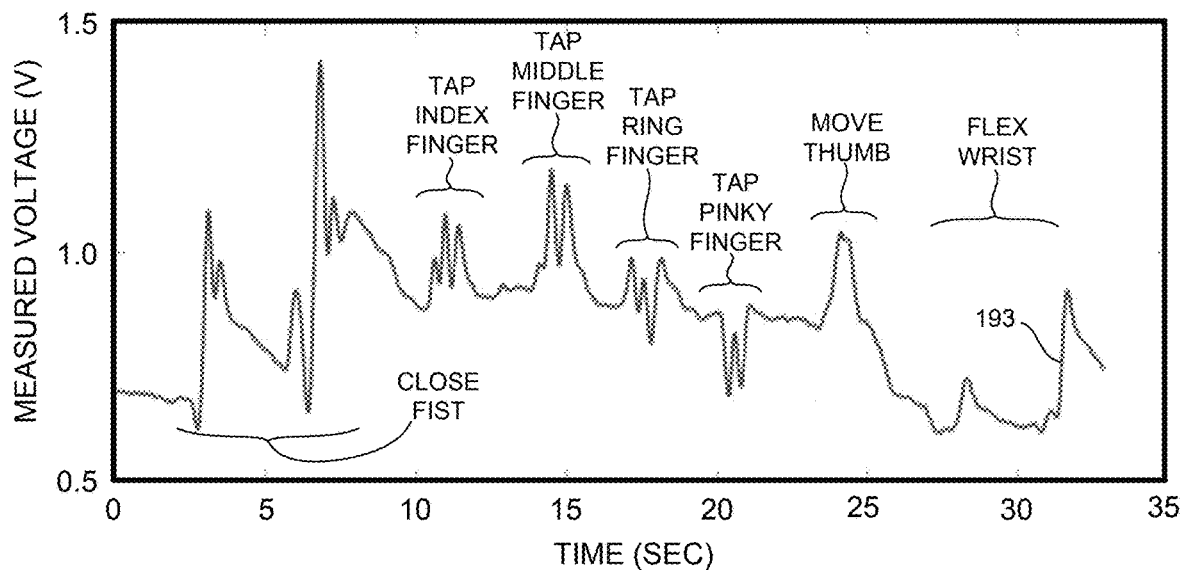
FIG. 12 depicts a plot of the output voltage signal of a photodetector of a muscle activity measurement system for a number of different hand motions.
Figures 13A, 13B:
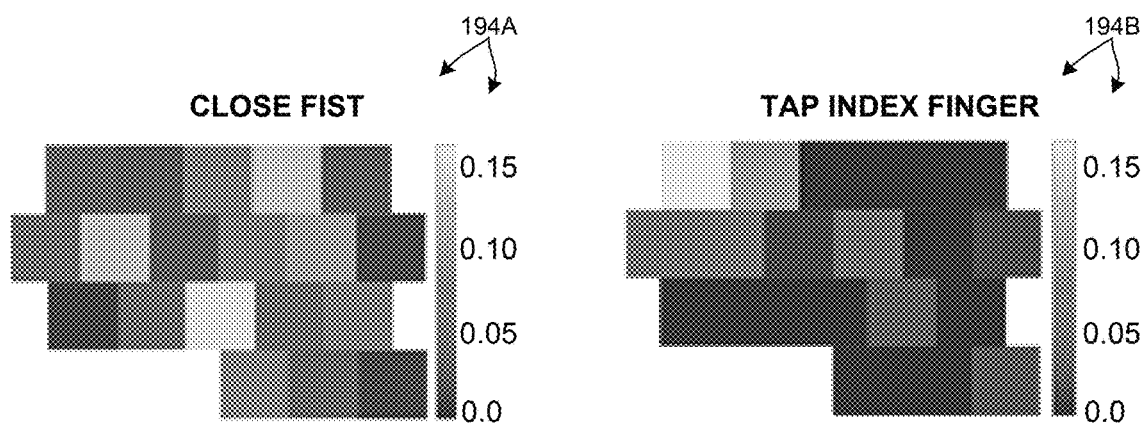
FIGS. 13A-G depict illustrations 194A-G, respectively, indicative of measured intensities at different photodetector locations on an elastic, wearable structure for different hand movements.
Figure 13C:
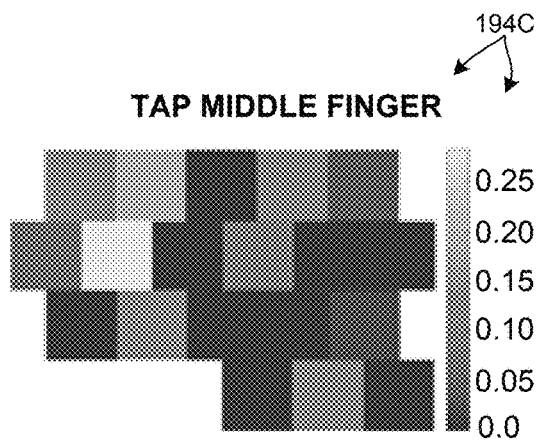
Figure 13D:
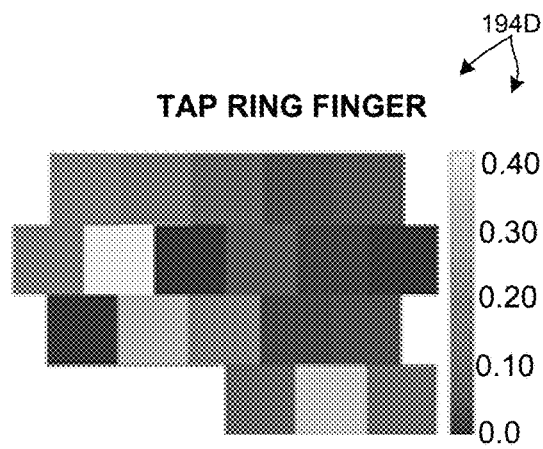
Figure 13E:
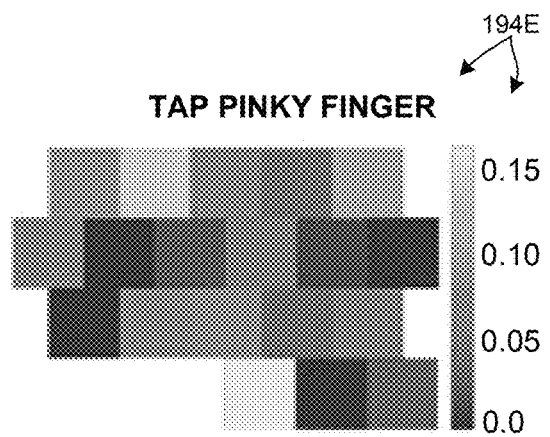
Figure 13F:
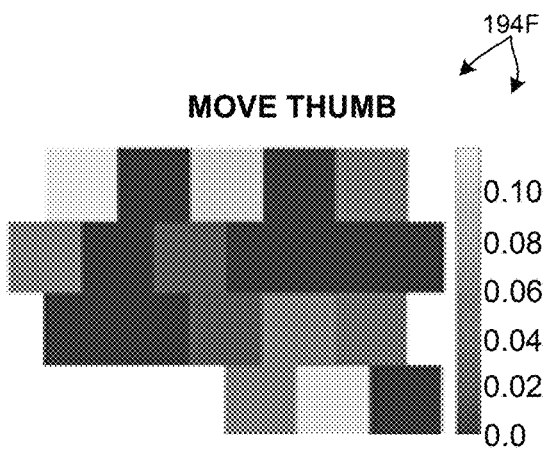
Figure 13G:
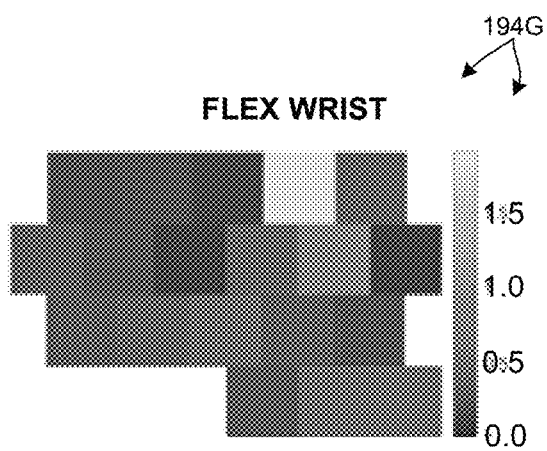

FIG. 12 depicts a plotline 193 of the output voltage signal of a photodetector of a muscle activity measurement system. The measured voltage is indicative of muscle activation over time for a series of hand movements as illustrated in FIG. 12. As depicted in FIG. 12, the muscle activity measurement system is sensitive to hand movements including repeatedly opening and closing the fist, tapping the index finger, tapping the middle finger, tapping the ring finger, tapping the pinky finger, moving the thumb, and flexing the wrist. Each of these movements exhibits a distinct signal response at a particular location.

FIGS. 13A-G depict illustrations 194A-G, respectively, indicative of measured intensities at different photodetector locations on the elastic, wearable structure 107 for different hand movements. Plot 194A depicts an illustration of measured intensities at different photodetector locations while closing the fist. Plot 194B depicts an illustration of measured intensities at different photodetector locations while tapping the index finger. Plot 194C depicts an illustration of measured intensities at different photodetector locations while tapping the middle finger. Plot 194D depicts an illustration of measured intensities at different photodetector locations while tapping the ring finger. Plot 194E depicts an illustration of measured intensities at different photodetector locations while tapping the pinky finger. Plot 194F depicts an illustration of measured intensities at different photodetector locations while moving the thumb. Plot 194G depicts an illustration of measured intensities at different photodetector locations while flexing the wrist. As illustrated in FIGS. 13A-G, each of these different movements exhibits a distinct signal response at different sensor locations.

In another aspect, a muscle pattern activity model is trained to determine muscle activity patterns from the optical measurement data collected from the optical illumination and sensing module. The muscle pattern activity model reduces a dimension of the measurement signal data 121. The muscle pattern activity model maps signals 121 to a new reduced set of signals. The muscle pattern activity model is determined based on the variations in the muscle activity patterns of interest embedded in the set of signals 121. Each signal is treated as an original signal that changes within the range of muscle activity executed by the human user. The muscle pattern activity model may be applied to all signals 121, or a subset of signals 121. In some examples, the signals subject to analysis by the muscle pattern activity model are chosen randomly. In some other examples, the signals subject to analysis by the transformation model are chosen due to their relatively high sensitivity to changes in the muscle activity of the human user.

Analyzing muscle activity patterns rather than all of the available optical signal data enables consistent interpretation of hemodynamic signals captured by the optical illumination and sensing module. The extracted muscle activity patterns are naturally occurring in the human limb as body movements are executed.

In some examples, optical measurement data collected by muscle activity monitoring system 101 is encoded to include information about the wavelength and measurement channel (e.g., the specific emitter/detector pair) from associated with each measurement signal. In this manner, muscle activity patterns are consistently and correctly determined. In some embodiments, additional tagging and sorting of optical measurement data is employed to segment measurements in terms of tissue depth, muscle group, or a combination thereof. In this manner, muscle activity patterns associated with sub-groups of muscles are more accurately determined.

Figure 18:
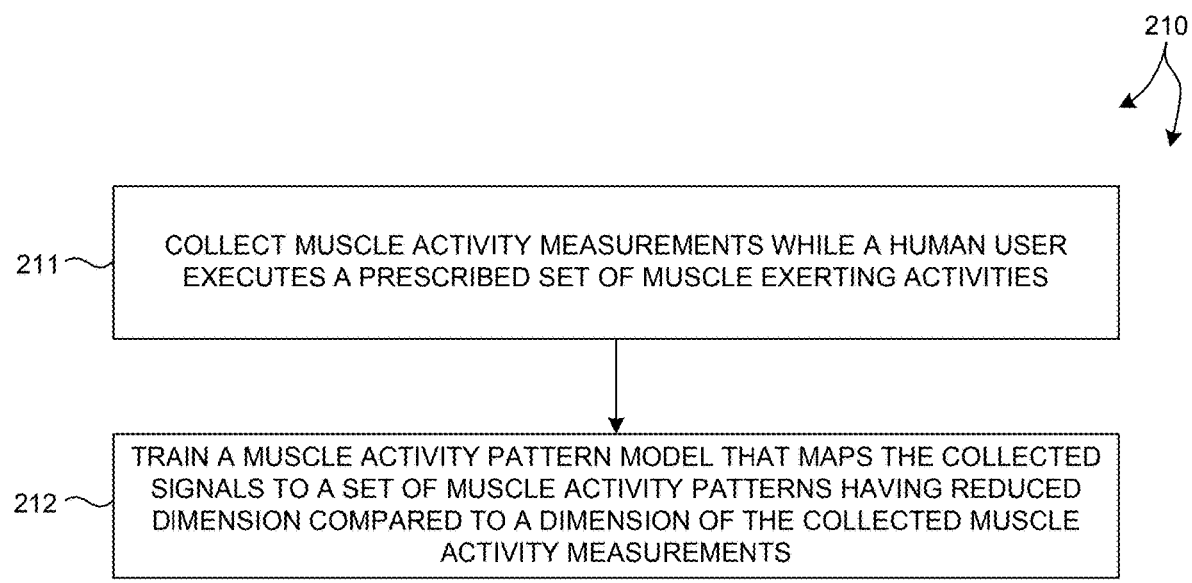
FIG. 18 illustrates a flowchart illustrative of a method 210 for training a muscle activity pattern model.

FIG. 18 illustrates a method 210 for training a muscle activity pattern model. Method 210 is suitable for implementation by a muscle activity measurement system such as muscle activity measurement system 101 illustrated in FIG. 1 of the present invention. In one aspect, it is recognized that data processing blocks of method 210 may be carried out via a pre-programmed algorithm executed by one or more processors of computing system 140, or any other general purpose computing system. It is recognized herein that the particular structural aspects of muscle activity measurement system 101 do not represent limitations and should be interpreted as illustrative only.

In block 211, muscle activity monitoring system 101 performs muscle activity measurements while a human user executes a prescribed set of muscle exerting activities. In one example, human user 102 is asked to repeatedly perform hand movements including repeatedly opening and closing a fist, tapping the index finger, tapping the middle finger, tapping the ring finger, tapping the pinky finger, moving the thumb, and flexing the wrist while optical measurement data is collected.

In block 212, muscle activity monitoring system 101 trains a muscle activity pattern model that maps the collected signals to a set of muscle activity patterns having reduced dimension. By way of non-limiting example, statistical analysis techniques, such as principal component analysis (PCA), independent component analysis (ICA), nonnegative matrix factorization (NMF) may be employed to extract muscle activation patterns expressed in low dimensional spatiotemporal structures. These patterns represent the behavioral modes and anatomical variations of individual users. Different users have different muscle activity patterns. The training of a muscle activity pattern model to each user accommodates specific user characteristics.

In another further aspect, a muscle activity measurement system calibrates the illumination intensity of each measurement channel, the programmable gain of each measurement channel, or both, to maximize measurement sensitivity.

In some embodiments, an efficient search algorithm is implemented to rapidly iterate among different illumination intensity levels, channel gain values, or both, to arrive at an illumination intensity level, channel gain value, or both, that maximizes the measured response to a range of prescribed gestures performed by the human user. For example, a human user may be asked to repeatedly perform a range of movements. During this time, the muscle activity measurement system repeatedly collects measurement data at a number of different illumination intensity levels, channel gain values, or both, to converge on an illumination intensity level, channel gain value, or both, that maximizes signal response over the range of prescribed movements.

In some examples, the optimization of the illumination intensity of each measurement channel, the programmable gain of each measurement channel, or both, is performed during initial training of the muscle activity measurement system by a particular human user. In this manner, the illumination intensity of each measurement channel, the programmable gain of each measurement channel, or both, are tuned to the specific human user and limb to be monitored. This calibration overcomes variations in tissue thickness, muscle density, skin color, etc., associated with different human users or limb locations.

In some examples, the optimization of the illumination intensity of each measurement channel, the programmable gain of each measurement channel, or both, is performed during each use of the muscle activity measurement system by a particular human user. The muscle activity measurement system is able to monitor muscle activity without direct contact with the skin. Users are able to more comfortably use the muscle activity monitoring system as direct and prolonged skin contact is no longer necessary. However, the human user is not expected to wear the same articles of clothing during every use of the muscle activity monitoring system. In these examples, the calibration overcomes variations in clothing thickness that may differ each time the muscle activity measurement system is used by the same human user.

Figure 14:
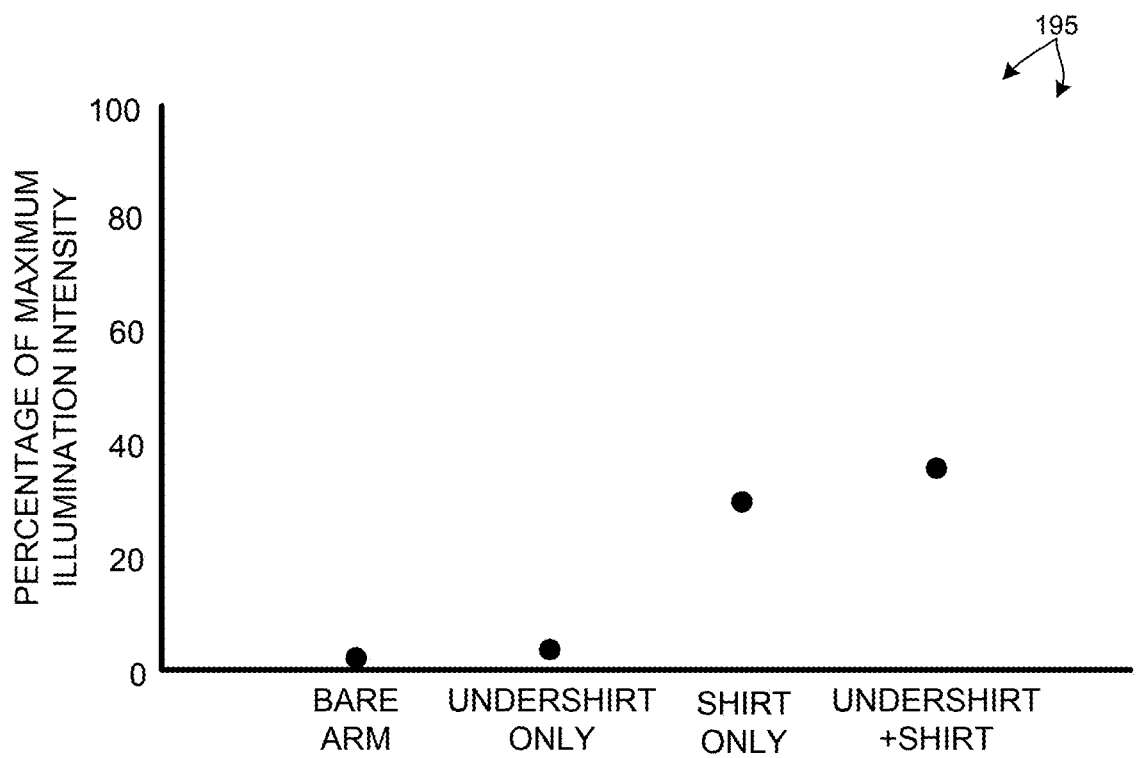
FIG. 14 depicts a scatter plot illustrative of the percentage of maximum illumination intensity required to achieve a predetermined amplitude of measured intensity under four different measurement scenarios.

FIG. 14 depicts a scatter plot 195 illustrative of the percentage of maximum illumination intensity required to achieve a predetermined amplitude of measured intensity under four different measurement scenarios. In the first scenario, the emitter and detector elements are located in direct contact with the skin of the forearm of a human user. In the second scenario, an undershirt is located between the emitter and detector elements and the skin of the forearm of a human user. In the third scenario, a shirt is located between the emitter and detector elements and the skin of the forearm of a human user. In the fourth scenario, both the undershirt and the shirt are located between the emitter and detector elements and the skin of the forearm of a human user. As depicted in FIG. 14, by adjusting the illumination intensity associated with each measurement channel, the muscle activity measurement system is able to overcome the presence of different articles of clothing located between the emitter and detector elements and the skin of the human user. Similarly, by adjusting the programmable gain of each measurement channel, the muscle activity measurement system is able to overcome the presence of different articles of clothing located between the emitter and detector elements and the skin of the human user.

Figure 15:
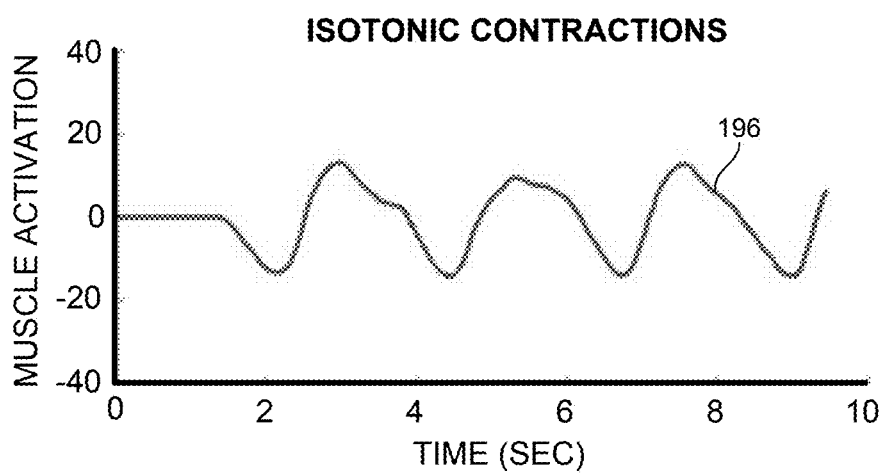
FIG. 15 depicts a plot of intensity measured by a photodetector of a muscle activity measurement system with an article of clothing located between the emitter and detector elements and the skin of the human user.

FIG. 15 depicts a plotline 196 of intensity measured by a photodetector of a muscle activity measurement system with an article of clothing located between the emitter and detector elements and the skin of the human user. The measured intensity is indicative of muscle activation over time for a series of isotonic muscle contractions. As depicted in FIG. 15, the muscle activity measurement system is sensitive to isotonic muscle contractions despite the presence of an article of clothing located between the emitter and detector elements and the skin of the human user.

In another further aspect, muscle activity measurement system 101 includes a motion sensing module 110, such as an inertial measurement device, to measure the movement of the muscle activity measurement system 101 with respect to the environment, i.e., inertial space occupied by the human user. In some embodiments, motion sensing module 110 includes one or more gyroscopes that generate output signals 111 indicative of the three dimensional orientation of the muscle activity measurement system 101 with respect to the gravitational field. In some embodiments, motion sensing module 110 includes one or more accelerometers that generate output signals 111 indicative of the linear acceleration of the muscle activity measurement system 101 in three dimensions. In some embodiments, the measured accelerations are integrated to estimate the velocity, position, or both, of the muscle activity measurement system 101 in three linear dimensions.

In some embodiments, the motion sensing module 110 is an integrated unit, such as an inertial measurement unit. In some embodiments, the motion sensing unit 110 includes a simple magnetometer that measures the magnetic field with respect to a magnet worn by the human user in a prescribed location (e.g., magnet embedded in a ring located on a particular finger or bracelet located on the wrist). In this manner, the magnetometer generates output signals 111 indicative of the motion of the muscle activity measurement system 101 relative to another portion of the human body (the portion of the human body wearing the reference magnet).

In another further aspect, the rigid body motion of the muscle activity measurement system 101 measured by the motion sensing module 110 is employed by computing system 140 to validate muscle activity, filter out motion artifacts caused by, for example, breathing, involuntary tremor, or accidental contact, provide general range of motion, speed, reflex data, or any combination thereof.

In general, a muscle activity measurement system as described herein is repeatedly removed and replaced onto a portion of the human body. In many operational scenarios it is difficult for a human user to locate the muscle activity measurement system with respect to the human body with sufficient repeatability to enable highly accurate monitoring of muscle activity patterns.

In a further aspect, a muscle activity measurement system employs data from the motion sensing module and the optical illumination and sensing module to guide the human user to more accurately locate the muscle activity measurement system with respect to the human body.

Figure 16A:
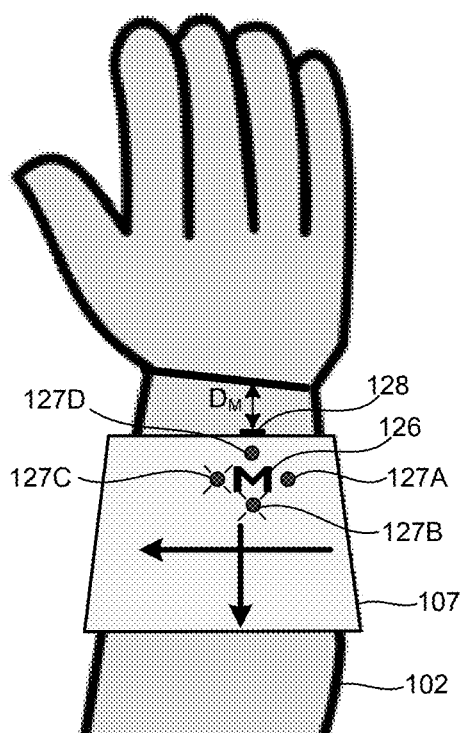
FIG. 16A depicts an elastic, wearable structure including a muscle activity monitoring system located on the forearm of human user before correcting location errors.

In an exemplary scenario, a human user is asked to locate a limb in a repeatable position in inertial space (e.g., hand on table top, palm down). In addition, the human user is asked to locate the muscle activity measurement system onto the limb such that a marker (e.g., logo) is oriented in a particular orientation with respect to the environment (e.g., straight up in the air) and located in a particular position with respect to the body (e.g., cuff of structure located at wrist joint), as close as they are able. For example, FIG. 16A depicts an elastic, wearable structure 107 including a muscle activity monitoring system onto the forearm of human user 102. As depicted in FIG. 16A, the user is asked to locate the logo 126 straight up in the air and centered on the forearm. Unfortunately, the user is not able to locate the muscle activity monitoring system with high accuracy. In this embodiment, computing system 140 receives signals 111 from motion sensing module 110 indicating the orientation of a muscle activity monitoring system with respect to the environment. Similarly, computing system 140 receives signals 121 from emitter/detector pair 128 indicating the distance between the edge of the wearable structure and a repeatable location on the human body (e.g., wrist, elbow, etc.).

Since the users hand is located in a repeatable position within the environment (e.g., hand on table, palm down), the measured orientation is indicative of the relative orientation of the muscle activity monitoring system with respect to the forearm. Based on the measured orientation, computing system 140 determines a misalignment between the measured orientation and the desired orientation. Similarly, since the desired location of the wearable structure with respect to the body is known, the measured position is indicative of a misalignment of the muscle activity monitoring system with respect to the forearm.

Figure 16B:
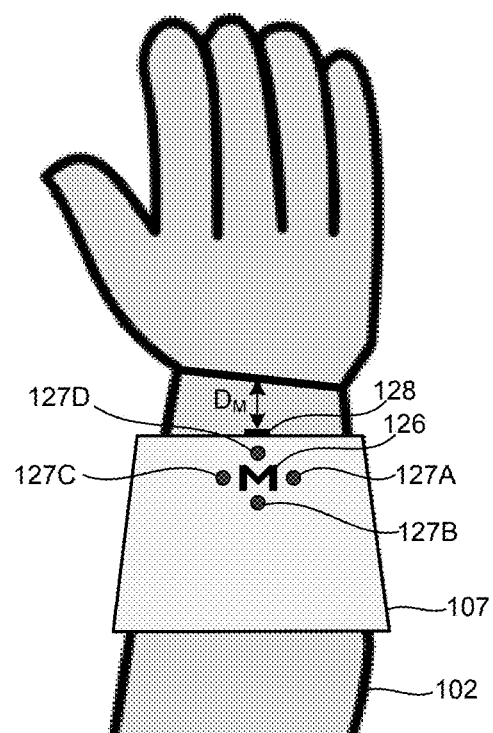
FIG. 16B depicts the elastic, wearable structure of FIG. 16A after correcting location errors.

In addition, computing system 140 communicates command signals 131 to display elements 130 to signal to the user which direction to move the wearable structure to reduce the orientation and position errors. As depicted in FIGS. 16A and 16B, the muscle activity measurement system includes display elements 127A-D (i.e., indicator lights). Computer system 140 communicates command signals 131 to indicator lights 127A-D to indicate the desired direction of movement of the wearable structure relative to the forearm. As depicted in FIG. 16A, indicator light 127C is illuminated to indicate the direction of rotation of the wearable structure with respect to the forearm. Similarly, indicator light 127B is illuminated to indicate the direction of translation of the wearable structure with respect to the forearm (i.e., away from the wrist). As illustrated in FIG. 16B, all indicator lights are "off", indicating that the human user has satisfactorily located the wearable structure with respect to the forearm.

Although, in some embodiments, a muscle activity measurement system is configured to guide the human user to locate the muscle activity measurement system with respect to the human body with improved repeatability, in some operational scenarios it is desirable to further calibrate the alignment of the muscle activity measurement system with respect to the body of the human user to enable highly accurate monitoring of muscle activity patterns.

In a further aspect, a muscle activity measurement system employs data from the motion sensing module to further calibrate the alignment of the muscle activity measurement system with respect to the body of the human user.

Figure 19:
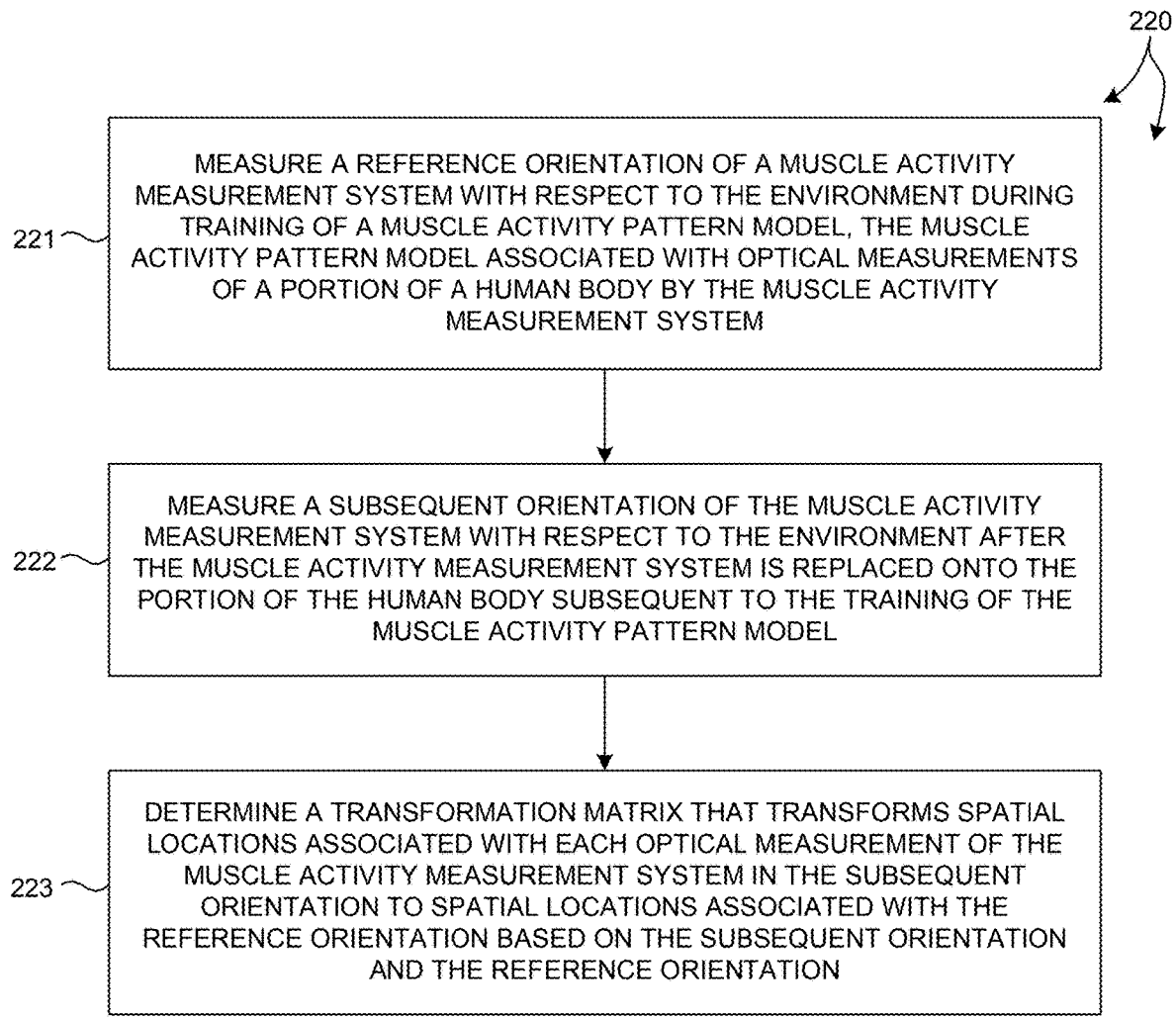
FIG. 19 illustrates a flowchart illustrative of a method 220 for determining a sensor alignment model to reduce errors in the alignment of the muscle activity measurement system with respect to the body of the human user each time the system is replaced onto the human body.

FIG. 19 illustrates a method 220 for determining a sensor alignment model to reduce errors in the alignment of the muscle activity measurement system with respect to the body of the human user each time the system is replaced onto the human body. Method 220 is suitable for implementation by a muscle activity measurement system such as muscle activity measurement system 101 illustrated in FIG. 1 of the present invention. In one aspect, it is recognized that data processing blocks of method 220 may be carried out via a pre-programmed algorithm executed by one or more processors of computing system 140, or any other general purpose computing system. It is recognized herein that the particular structural aspects of muscle activity measurement system 101 do not represent limitations and should be interpreted as illustrative only.

In block 221, motion sensing module 110 measures a reference orientation of the muscle activity measurement system 101 with respect to the environment during training of a muscle activity pattern model. The muscle activity pattern model is trained based on optical measurements of a portion of a human body by the muscle activity measurement system.

In block 222, motion sensing module 110 measures a subsequent orientation of the muscle activity measurement system 101 with respect to the environment after the muscle activity measurement system is replaced onto the same portion of the human body subsequent to training of a muscle activity pattern model.

In block 223, computing system 140 determines a transformation matrix that transforms the spatial locations associated with each optical measurement of the muscle activity measurement system in the subsequent orientation to spatial locations associated with the reference orientation based on the subsequent orientation and the reference orientation.

For example, $A_0$ is the orientation of the muscle activity measurement system 101 measured by the motion sensing module 110 while the wearable structure is worn during training of the muscle activity pattern model. $A_1$ is the orientation of the muscle activity measurement system 101 measured by the motion sensing module 110 during the subsequent use instance. The subsequent use instance is some use instance after the wearable structure has been removed from the human user after training and replaced onto the body of the human user. A transformation matrix R transforms data in the subsequent orientation, $A_1$, to the reference orientation $A_0$, in accordance with the equation $A_0 = R*A_1$. In one example, computing system 140 determines the transformation matrix in accordance with the equation, $R = A_0 * A_1^{-1}$.

In another further aspect, a muscle activity measurement system employs optical measurement data from the optical illumination and sensing module to further calibrate the alignment of the muscle activity measurement system with respect to the body of the human user.

Figure 20:
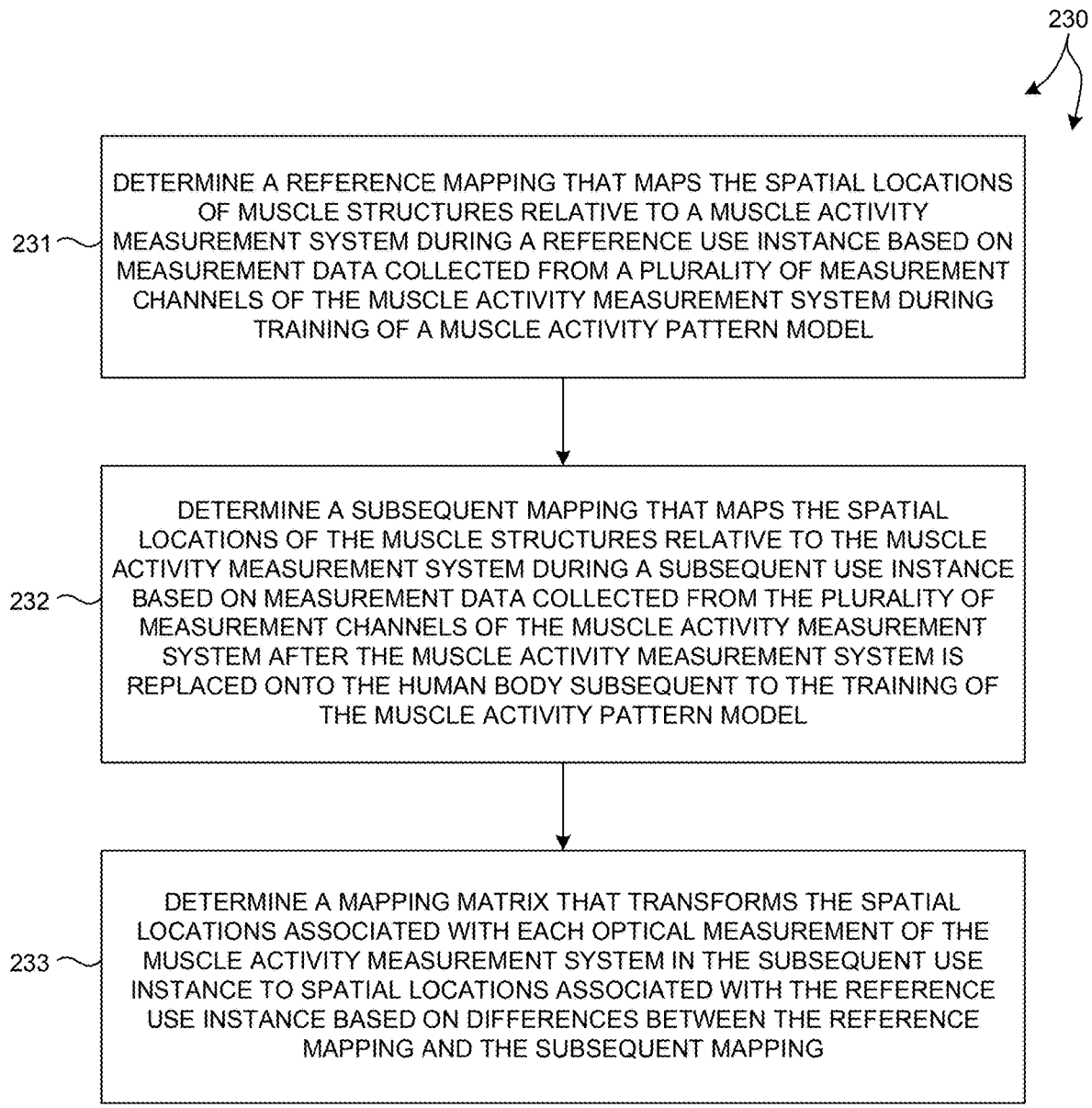
FIG. 20 illustrates a flowchart illustrative of another method 230 for determining a sensor alignment model to reduce errors in the alignment of the muscle activity measurement system with respect to the body of the human user each time the system is replaced onto the human body.

FIG. 20 illustrates a method 230 for determining a sensor alignment model to reduce errors in the alignment of the muscle activity measurement system with respect to the body of the human user each time the system is replaced onto the human body. Method 230 is suitable for implementation by a muscle activity measurement system such as muscle activity measurement system 101 illustrated in FIG. 1 of the present invention. In one aspect, it is recognized that data processing blocks of method 230 may be carried out via a pre-programmed algorithm executed by one or more processors of computing system 140, or any other general purpose computing system. It is recognized herein that the particular structural aspects of muscle activity measurement system 101 do not represent limitations and should be interpreted as illustrative only.

In block 231, computing system 140 generates a reference mapping that maps the spatial locations of muscle structures relative to a muscle activity measurement system during a reference use instance based on measurement data collected from a plurality of measurement channels of the muscle activity measurement system during training of a muscle activity pattern model.

In block 232, computing system 140 generates a subsequent mapping that maps the spatial locations of the same muscle structures relative to the muscle activity measurement system during a subsequent use instance based on measurement data collected from the plurality of measurement channels of the muscle activity measurement system after the muscle activity measurement system is replaced onto the human body subsequent to training of the muscle activity pattern model.

In block 233, computing system 140 determines a sensor alignment model that transforms the spatial locations associated with each optical measurement of the muscle activity measurement system in the subsequent use instance to spatial locations associated with the reference use instance based on differences between the reference mapping and the subsequent mapping.

In another further aspect, muscle activity patterns are measured based on optical response signals collected by the muscle activity measurement system while a human user engages in voluntary muscle activity.

Figure 17:
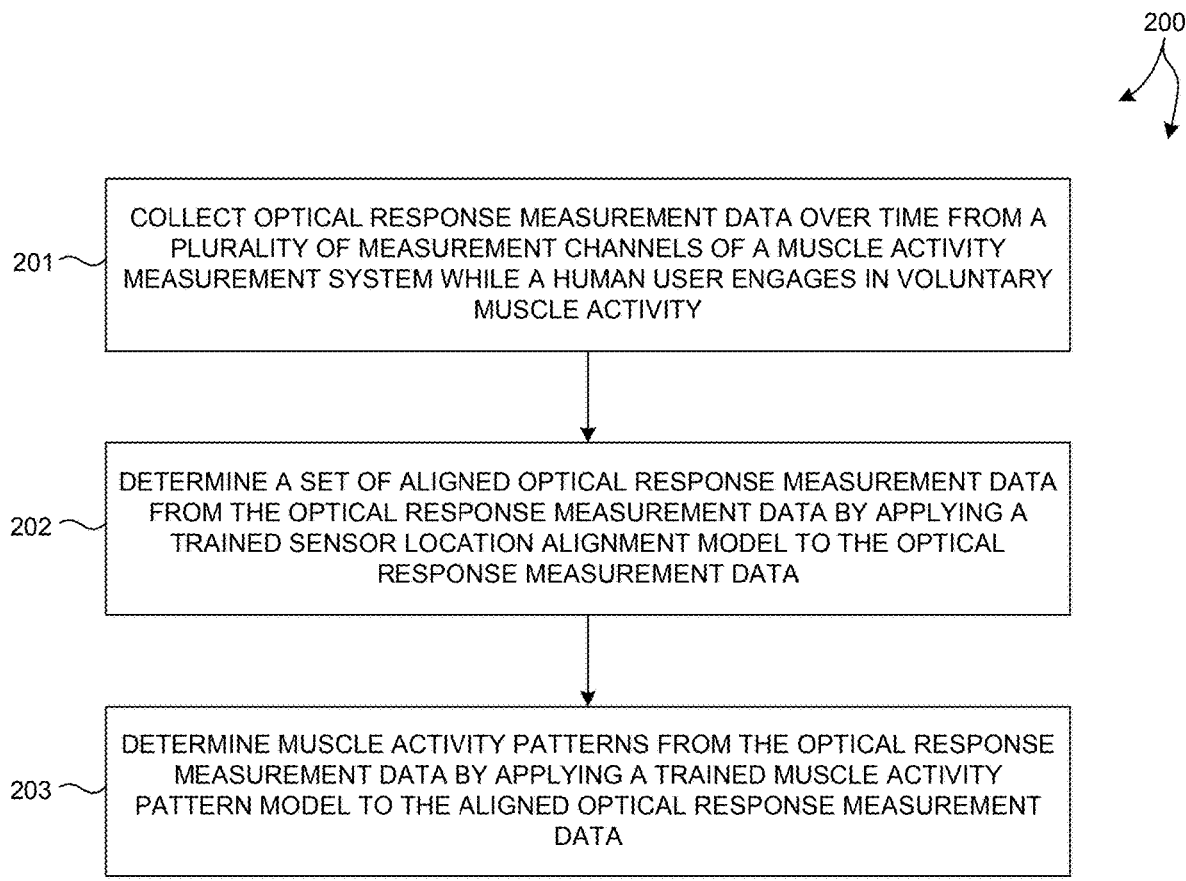
FIG. 17 depicts a flowchart illustrative of a method 200 for determining muscle activity patterns while a human user engages in voluntary muscle activity.

FIG. 17 illustrates a method 200 for determining muscle activity patterns while a human user engages in voluntary muscle activity. Method 200 is suitable for implementation by a muscle activity measurement system such as muscle activity measurement system 101 illustrated in FIG. 1 of the present invention. In one aspect, it is recognized that data processing blocks of method 200 may be carried out via a pre-programmed algorithm executed by one or more processors of computing system 140, or any other general purpose computing system. It is recognized herein that the particular structural aspects of muscle activity measurement system 101 do not represent limitations and should be interpreted as illustrative only.

In block 201, a muscle activity measurement system collects optical response measurement data over time from a plurality of measurement channels of the muscle activity measurement system while a human user engages in voluntary muscle activity.

In block 202, computing system 140 determines a set of aligned optical response measurement data from the optical response measurement data by applying a trained sensor location alignment model to the optical response measurement data.

In block 203, computing system 140 determines muscle activity patterns from the aligned optical response measurement data by applying a trained muscle activity pattern model to the optical response measurement data.

In another further aspect, gestures executed by a human user are detected based on measured muscle activity patterns based on a trained gesture detection model. The trained gesture detection model is an input-output model that receives measured muscle activity patterns as input and provides a detected gesture as output.

The muscle activity patterns extracted from optical measurement data as described herein are used to correlate to user intent via a trained gesture detection model. In some examples, a gesture detection model is a classification model such as a Neural Network model, a Decision Tree model, a Support Vector Machine model, etc.

In some examples, training data is collected by measuring muscle activity patterns while a human user executes a prescribed set of gestures. The measured muscle activity patterns and associated gestures are provided as inputs to train the gesture detection model.

In general, muscle activity patterns represent groups of optical measurement signals, particularly optical measurement signals that are exceptionally sensitive to the prescribed muscle activities. Thus, muscle activity patterns are less vulnerable to noise or inconsistencies in neural signals. As a result, the detection of gesture based on muscle activity patterns results in improved accuracy and robustness of the gesture detection model. Furthermore, the training of a gesture detection model based on muscle activity patterns is reduced due to the dimensional reduction inherent to muscle activity patterns.

In another further aspect, an assistive robotic device is controlled based on gestures detected as described herein. In this manner, a wearable muscle activity monitoring system facilitates the operation of other assistive robots, such as exoskeletons, prostheses, and modular robotic arms mounted on tables, wheelchairs, or the human user.

Figure 21:
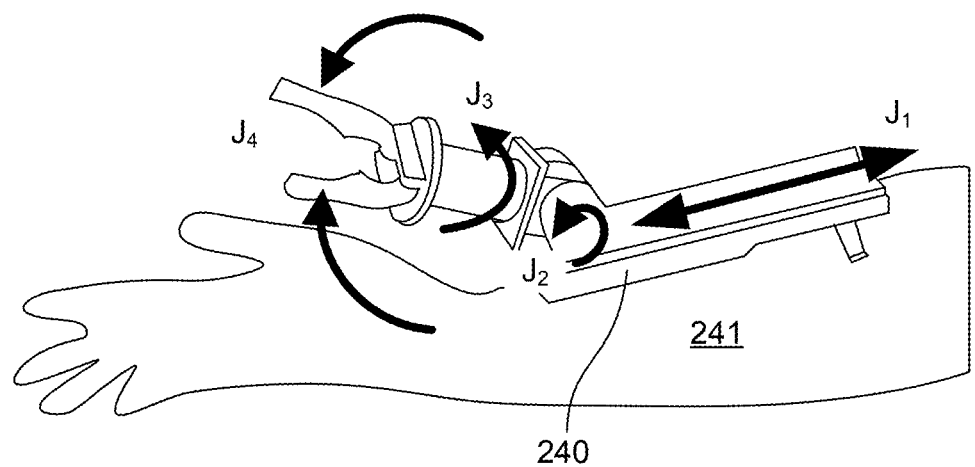
FIG. 21 depicts a diagram illustrative of an embodiment of a wearable gripper device by way of non-limiting example.

FIG. 21 depicts an embodiment 240 of a wearable gripper device by way of non-limiting example. Wearable gripper device 240 is a two-fingered gripper that can hold a variety of objects at diverse postures with a regulated force in a required force range. As depicted in FIG. 21, wearable gripper device 240 is attached to the forearm 241 of a human user. Wearable gripper device 240 is a four degree-of-freedom device that includes prismatic actuator capable of generating linear motion characterized by joint, J1, a rotary actuator capable of generating rotary motion characterized by joint, J2, a rotary actuator capable of generating rotary motion characterized by joint, J3, and a gripper actuator capable of generating the coordinated rotary motion of the gripper fingers characterized by joint, J4.

Figure 22:
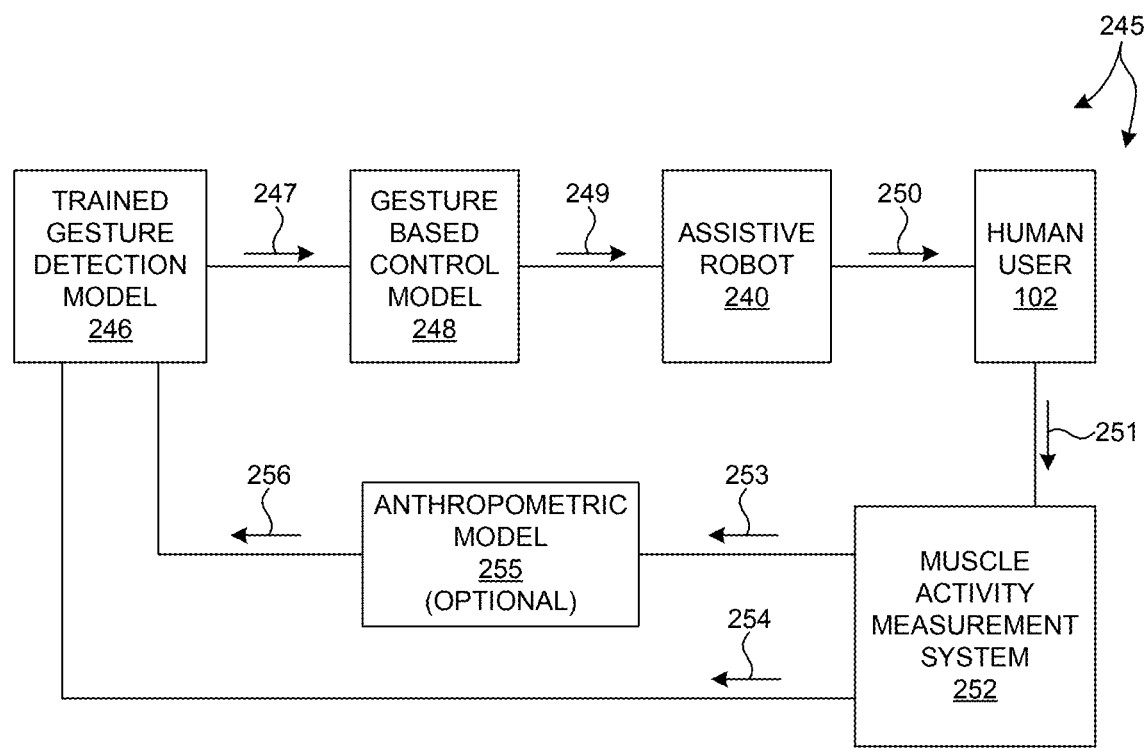
FIG. 22 depicts a simplified flowchart of a control scenario involving a muscle activity measurement system operating in coordination with an assistive robotic device to execute tasks based on detected gestures.

FIG. 22 depicts a simplified flowchart 245 of a control scenario involving a muscle activity measurement system operating in coordination with an assistive robotic device to execute tasks based on detected gestures.

As depicted in FIG. 22, human user exerts some amount of muscular effort. The muscle activity measurement system 252 determines muscle activity patterns 254 in response to the human user activity as described herein. Trained gesture detection model 246 detects a gesture 247 from the measured muscle activity patterns 254. A gesture based control model 248 translates detected gesture 247 into joint commands 249 communicated to an assistive robot device 240. In response to the joint commands 249, the robot responds physically (e.g., performs a specific task). In turn, human user 102 reacts to the activity of the assistive robot, and exerts new muscular efforts detected by the muscle activity measurement system 252.

In some embodiments, each movement or gesture of the user 102 is programed to control a single degree of freedom of the assistive robot. This allows the human user to freely control the motion of the robot by combining different gestures as they see fit. However, in some other embodiments, each movement or gesture of the user is programed to control a coordinated robot motion involving multiple degrees of freedom to reduce the burden on the human user and adapt a relatively small set of user gestures to a wide range of robot designs. This reduces the amount of user training required to successfully deploy an assistive robot. In addition, control of a complex robot on a joint by joint basis is limited especially when the physical or mental capabilities of the human user are compromised.

In some examples, the gesture based control model 248 is trained using a teaching-by-showing technique. In these examples, a user demonstrates a control gesture (e.g., lift index finger). In conjunction with the control gesture, the robot is moved along a desired trajectory to perform a simple task, while the robot records the desired robot movement. The movement of the robot may be executed by the user, or if the user is not able to move the robot alone, this step may be completed with the help of others. In this manner, the demonstrated control gesture is linked to the recorded robot movement. Furthermore, the gesture based control model 248 commands the assistive robot 240 to repeat the desired robot movement each time the corresponding control gesture is detected.

As depicted in FIG. 21, different gestures can be linked to various robot commands, such as moving the end effector of assistive robot 240 to preprogrammed locations and open-close the end effector to grasp/release objects.

In another further aspect, rigid body motion of the muscle activity measurement system 252 measured, for example, by motion sensing module 110, is employed to estimate muscle activity patterns on a faster time scale than optical based measurements.

There is a delay between the onset of EMG signals and muscle activity that become visible in the optical measurement signals due to the inherent biological time difference between when an electrical signal is sent to activate the muscles and when blood flow within the muscles starts to change. Depending on the application, such a delay may not be acceptable in the context of an assistive robot.

In the embodiment depicted in FIG. 22, an anthropometric model 255 predicts muscle activity patterns 256 based on rigid body motion 253 of the muscle activity measurement system 252 measured by the motion sensing module 110. The sensors of motion sensing module 110 are not subject to excessive delay, and thus provide the basis for a fast estimation of the muscle activity pattern via anthropometric model 255. The estimated muscle activity pattern is communicated to trained gesture detection model 246, and used to update the muscle activity pattern on short time scale, while measured muscle activity pattern 254 is used to update the muscle activity pattern on a longer time scale.

In general, a muscle activity measurement system integrated with a wearable structure may be wearable in a number of different ways to accommodate patients with different levels of disability. For example, patients who have some movement capability in a few fingers and wrist may wear a muscle activity measurement system on the forearm of their impaired side, next to the assistive robot being controlled. The human gestures will be non-functional in terms of task performance but sufficient for robot control. On the other hand, patients who have no movement capability left may wear a muscle activity measurement system on the forearm of their healthy side. Sequential control will need to be employed, where the user switches between linking gestures to the movement of the assistive robot movement and unlinking to separate control gestures from movements ordinarily involved in task performance.

In general, a muscle activity measurement system may be wearable on other parts of the body, such as the abdominal muscles, leg muscles, etc.

In another further aspect, a muscle activity measurement system is employed to map muscle structure periodically over time for a prescribed set of human movements. Measured changes in the muscle structure are indicative of the progress of a rehabilitation treatment program.

As depicted in FIG. 1, muscle activity measurement system 101 is communicatively coupled to a server 180 via a networked communications link. By way of non-limiting example, muscle activity measurement system 101 communicates signals 152 and 153 to and from network gateway 160 over a wireless communications link operating in accordance with a wireless protocol (e.g. WiFi, Bluetooth, Bluetooth LE, etc.). Network gateway 160 may be a dedicated network device, such as a wireless router, or a general purpose computing device having wireless communications capability and a link to the internet 170 (e.g., a mobile communications device linked to the internet 170 via a wireless communications network, a local computing device linked to the internet 170 via a wired or wireless communications network). In some embodiments, signals 152 and 153 are communicated between server 180 and muscle activity measurement system 101.

Server 180 may be part of a cloud-based server system. Muscle activity information is stored in memory (e.g., memory 184) on server 180, and such information may be made available to rehabilitation physicians and therapists to customize treatments according to the physical performance of each patient. Control parameters may be communicated from server 180 to muscle activity measurement system 101.

In addition, analytical results extracted from stored measurement data or other information may be communicated to a mobile communications device or other local computing device, where the device may display the analytical results to a user of the muscle activity measurement system. Examples of analytical data displayed to a user include current measured biological and functional information, exercises performed each day, exercise goals and compliance, historical data and trends, direct messages exchanged with rehabilitation doctors and physical therapists, communications with an online community of peers to share recovery status and achievements, etc.

As depicted in FIG. 1, computing system 140 includes a processor 141, a memory 142, and a bus 145. Processor 141 and memory 142 are configured to communicate over bus 145. Memory 142 includes an amount of memory 144 that stores measurement data collected from sensors of muscle activity measurement system 101. Memory 142 also includes an amount of memory 143 that stores program code that, when executed by processor 141, causes processor 141 to implement muscle activity monitoring functionality as described herein.

As depicted in FIG. 1, server 180 includes a processor 181, a memory 182, and a bus 185. Processor 181 and memory 182 are configured to communicate over bus 185. Memory 182 includes an amount of memory 184 that stores measurement data collected from sensors of muscle activity measurement system 101. Memory 182 also includes an amount of memory 183 that stores program code that, when executed by processor 181, causes processor 181 to implement muscle activity monitoring functionality as described herein. In this manner, the computational burden of muscle activity monitoring functionality as described herein may be placed on computing system 140, computing system 180, or any other suitable computing system, or combination of computing systems.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A muscle activity measurement system, comprising:
    an elastic, wearable structure configured to be disposed over a portion of a body of a human user, the portion of the body including one or more subcutaneous muscle structures;
    a first plurality of optical illumination devices located on the wearable structure, a light emitting surface of each of the first plurality of optical illumination devices facing a direction normal to a surface of the portion of the body of the human user, wherein at least one of the first plurality of optical illumination devices emits illumination light at a different wavelength than another of the plurality of optical illumination devices;
    a first plurality of photodetectors located on the wearable structure, a photosensitive surface of each of the first plurality of photodetectors facing the direction normal to the surface of the portion of the body of the human user, wherein each of the first plurality of photodetectors generates an output signal indicative of an intensity of light incident on the photosensitive surface;
    a second optical illumination device located on the wearable structure having a light emitting surface facing a direction parallel to the surface of the portion of the body of the human user;
    a second photodetector located on the wearable structure having a photosensitive surface facing a direction parallel to the surface of the portion of the body of the human user, wherein the second photodetector generates an output signal indicative of an intensity of light incident on the photosensitive surface of the second photodetector in response to an amount of light provided by the second optical illumination device;
    a computing system communicatively coupled to the first plurality of optical illumination devices, the second optical illumination device, the first plurality of photodetectors, and the second photodetector, wherein the computing system,
        communicates an illumination control signal to each of the first plurality of optical illumination devices causing each of the first plurality of optical illumination devices to provide illumination light in response to the illumination control signal, receives the output signal indicative of the intensity of light incident on the photosensitive surface from each photodetector of the first plurality of photodetectors in response to the provided illumination light,
        determines at least one muscle activity pattern associated with the one or more subcutaneous muscle structures based on the output signals from each of the first plurality of photodetectors,
        determines a gesture of the human user based on the at least one muscle activity pattern and a trained gesture detection model, wherein the trained gesture detection model is a neural network model, a decision tree model, or a support vector machine model, wherein the at least one muscle activity pattern is an input of the trained gesture detection model and the determined gesture is an output of the trained gesture detection model, and wherein the trained gesture detection model is trained based on a prescribed set of gestures and muscle activity patterns measured while the human user executes the prescribed set of gestures, wherein a motion trajectory of an assistive robot is controlled based on the determined gesture,
        receives the output signal generated by the second photodetector, and
        determines a location of the muscle activity measurement system with respect to the body of the human user based on the output signal generated by the second photodetector.

2. The muscle activity measurement system of claim 1, wherein a distance between a first of the first plurality of optical illumination devices and a first of the first plurality of photodetectors is different from a distance between a second of the first plurality of optical illumination devices and a second of the first plurality of photodetectors.

3. The muscle activity measurement system of claim 1, further comprising:
    a motion sensing module communicatively coupled to the computing system, wherein the motion sensing module includes one or more inertial sensors that measure an orientation of the muscle activity measurement system with respect to a gravitational field.

4. The muscle activity measurement system of claim 1, wherein the illumination control signal causes each of the first plurality of optical illumination devices to provide illumination light sequentially.

5. The muscle activity measurement system of claim 1, wherein the illumination control signal causes at least two of the first plurality of optical illumination devices to provide illumination light simultaneously.

6. The muscle activity measurement system of claim 1, wherein each of the plurality of optical illumination devices is a light emitting diode.

7. The muscle activity measurement system of claim 1, wherein a wearable garment is configured to be disposed between the wearable structure and the portion of the body of the human user.

* * * * *